US012726734B2

(12) United States Patent
Wang et al.

(10) Patent No.: US 12,726,734 B2
(45) Date of Patent: Sep. 1, 2026

(54) PIXEL OF IMAGE SENSOR AND IMAGE SENSOR

(71) Applicants: HUAWEI TECHNOLOGIES CO., LTD., Shenzhen (CN); Institute of Semiconductors, Chinese Academy of Sciences, Beijing (CN)

(72) Inventors: Yaoyuan Wang, Beijing (CN); Ziyang Zhang, Beijing (CN); Liyuan Liu, Beijing (CN); Huanhui Zhang, Beijing (CN); Jianxing Liao, Shenzhen (CN); Ying Wang, Shenzhen (CN); Heming Huang, Shanghai (CN)

(73) Assignees: Huawei Technologies Co., Ltd., Shenzhen (CN); Institute of Semiconductors, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/963,458

(22) Filed: Nov. 27, 2024

(65) Prior Publication Data

US 2025/0097601 A1 Mar. 20, 2025

Related U.S. Application Data

(63) Continuation of application No. PCT/CN2023/096805, filed on May 29, 2023.

(30) Foreign Application Priority Data

May 30, 2022 (CN) ......................... 202210597585.4

(51) Int. Cl.
*H04N 25/77* (2023.01)
*H04N 23/667* (2023.01)
(Continued)

(52) U.S. Cl.
CPC ........... *H04N 25/77* (2023.01); *H04N 23/667* (2023.01); *H04N 25/768* (2023.01); *H04N 25/78* (2023.01); *G01S 17/894* (2020.01)

(58) Field of Classification Search
CPC .... H04N 25/77; H04N 23/667; H04N 25/768; H04N 25/78; H04N 25/705; G01S 17/894; G01S 7/4863; G01S 17/08–36
(Continued)

(56) References Cited

U.S. PATENT DOCUMENTS

| | | | | |
|---|---|---|---|---|
| 10,382,736 | B1 * | 8/2019 | Thurner | G01S 17/36 |
| 2013/0278917 | A1 * | 10/2013 | Korekado | G01S 7/484<br>356/5.01 |
| 2022/0113425 | A1 * | 4/2022 | Ayel | G01S 7/4914 |

FOREIGN PATENT DOCUMENTS

| | | |
|---|---|---|
| CN | 109313264 A | 2/2019 |
| CN | 115190220 A | 10/2022 |

OTHER PUBLICATIONS

Brandli et al., "A 240×180 130 dB 3 μs Latency Global Shutter Spatiotemporal Vision Sensor," IEEE Journal of Solid-State Circuits, vol. 49, No. 10, doi: 10.1109/JSSC.2014.2342715, total 9 pages, Institute of Electrical and Electronics Engineers, New York, New York (Oct. 2014).

(Continued)

*Primary Examiner* — Yogesh K Aggarwal
(74) *Attorney, Agent, or Firm* — Leydig, Voit & Mayer, Ltd.

(57) ABSTRACT

This application provides a pixel of an image sensor and an image sensor. The pixel may include an optical-to-electrical conversion circuit and a composite measurement circuit. The optical-to-electrical conversion circuit may be configured to generate a first current based on incident light that is incident on the pixel. The composite measurement circuit is coupled to the optical-to-electrical conversion circuit. The
(Continued)

pixel may have a first operating mode and a second operating mode. The composite measurement circuit may generate a first pulse signal based on the first current when the pixel operates in the first operating mode, where the first pulse signal represents the intensity information of the incident light. When the pixel operates in the second operating mode, the pixel receives a plurality of sampling signals, and generates a plurality of second pulse signals based on the first current and the plurality of sampling signals.

20 Claims, 10 Drawing Sheets

(51) Int. Cl.

| | |
|---|---|
| ***H04N 25/768*** | (2023.01) |
| ***H04N 25/78*** | (2023.01) |
| *G01S 17/894* | (2020.01) |

(58) Field of Classification Search
USPC .... 348/222.1–229.1, 294–324; 356/5.01–5.8
See application file for complete search history.

(56) References Cited

OTHER PUBLICATIONS

Posch et al., "A QVGA 143 dB Dynamic Range Frame-Free PWM Image Sensor With Lossless Pixel-Level Video Compression and Time-Domain CDS," IEEE Journal of Solid-State Circuits, vol. 46, No. 1, doi: 10.1109/JSSC.2010.2085952, total 17 pages, Institute of Electrical and Electronics Engineers, New York, New York (Jan. 2011).

* cited by examiner

PIXEL OF IMAGE SENSOR AND IMAGE SENSOR

CROSS-REFERENCE TO RELATED APPLICATIONS

This application is a continuation of International Application No. PCT/CN2023/096805, filed on May 29, 2023, which claims priority to Chinese Patent Application No. 202210597585.4, filed on May 30, 2022. The disclosures of the aforementioned applications are hereby incorporated by reference in their entireties.

TECHNICAL FIELD

Embodiments of this application relate to image sensor technologies, and in particular, to a pixel of an image sensor and an image sensor.

BACKGROUND

As application scenarios of an image sensor increase, types of the image sensor also increase continuously. When light irradiated on an object is incident to the image sensor, each pixel in the image sensor may convert the incident light incident to the pixel into a corresponding electrical signal. A processor may generate an image of an object or determine a change status of the object based on the electrical signal provided by each pixel in the image sensor.

Processes of converting incident light into electrical signals by different types of image sensors are different. For example, a grayscale image sensor uses an electrical signal converted from the incident light to represent light intensity information of the incident light. The processor may generate the image of the object by using the light intensity information. A dynamic visual image sensor uses the electrical signal converted from the incident light to represent a variation of the light intensity of the incident light. The processor may update the image by using the variation of the light intensity. The grayscale image sensor and the dynamic visual image sensor are usually referred to as two-dimensional image sensors. The intensity information of the incident light and the variation of the light intensity of the incident light that are respectively generated are referred to as two-dimensional information.

A time-of-flight image sensor uses the electrical signal converted from the incident light to represent time-of-flight information of the incident light, and the incident light is light generated by reflecting an active light source by the object. The processor may determine a distance between the object and the active light source based on the time-of-flight information, that is, determine a depth between the object and the active light source. Therefore, the time-of-flight image sensor is usually referred to as a three-dimensional image sensor, and the time-of-flight information of the incident light generated by the time-of-flight image sensor is referred to as three-dimensional information.

In some new application scenarios of the image sensor, a plurality of types of image sensors are usually required. For example, in an autonomous driving scenario, a vehicle needs to accurately detect a status of a surrounding object. Generally, the vehicle emits an active light source, and the active light source is reflected after encountering a detected object. The vehicle needs to process light reflected to an image sensor to generate two-dimensional information or three-dimensional information, to generate a two-dimensional image or a three-dimensional image of the object. Therefore, a plurality of types of image sensors need to be disposed in the vehicle, incurring high costs. In addition, a process of matching information generated by pixels of different types of image sensors is complex.

SUMMARY

Embodiments of, this application provide a pixel of an image sensor and an image sensor, to provide intensity information and time-of-flight information of incident light.

According to a first aspect, a pixel of the image sensor provided in embodiments of this application may include an optical-to-electrical conversion circuit and a composite measurement circuit. The optical-to-electrical conversion circuit may be configured to generate a first current based on incident light that is incident on the pixel. The composite measurement circuit is coupled to the optical-to-electrical conversion circuit. The pixel may have a plurality of operating modes, such as a first operating mode and a second operating mode. When the pixel is in the first operating mode, intensity information of the incident light may be provided. When the pixel is in the second operating mode, time-of-flight information of the incident light may be provided. The composite measurement circuit may generate a first pulse signal based on the first current when the pixel operates in the first operating mode, where the first pulse signal represents the intensity information of the incident light. When the pixel operates in the second operating mode, the pixel receives a plurality of sampling signals, and generates a plurality of second pulse signals based on the first current and the plurality of sampling signals. The plurality of sampling signals are in a one-to-one correspondence with the plurality of second pulse signals. The plurality of second pulse signals represent a phase offset between a phase of the incident light and a specified phase. The incident light is a reflected light ray that is of the specified phase and that is incident to a target object. The specified phase may be a phase of active light. The phase offset between the phase of the incident light and the specified phase is the time-of-flight information of the incident light, and may be used to determine a distance between the pixel and the target object.

In this embodiment of this application, the composite measurement circuit outputs all data in a pulse form when the pixel is in different operating modes. Processing of an analog physical parameter in a peripheral circuit is reduced. A back-end circuit, for example, an image signal processor, may directly process the first pulse signal or the second pulse signal in a digital signal processing manner. In addition, the composite measurement circuit has a plurality of functions, and can provide the intensity information of the incident light and the time-of-flight information, thereby reducing an occupied area.

In a possible design, the composite measurement circuit includes a configuration signal receiving unit, an integration unit, a comparison unit, and a delay sampling unit. A first end of the configuration signal receiving unit is coupled to the optical-to-electrical conversion circuit. A second end of the configuration signal receiving unit is coupled to a first end of the integration unit and an input end of the comparison unit.

The configuration signal receiving unit may output, in the first operating mode, the first current to the integration unit; or receive, in the second operating mode a plurality of sampling signals, and periodically output the first current to the integration unit based on signal periods of the plurality of sampling signals. A second end of the integration unit is coupled to a first level, and the integration unit may be configured to integrate the first current to obtain a measured voltage, and provide the measured voltage to the comparison unit.

An input end of the comparison unit is coupled to the first end of the integration unit, and may be configured to: compare the measured voltage with a preset reference voltage, and send a comparison result signal to the delay sampling unit, where when the measured voltage is less than the reference level, a level of the comparison result signal is a second level, when the measured voltage is greater than or equal to the reference level, a level of the comparison result signal is a third level, and the second level is greater than the third level. The delay sampling unit is coupled to an output end of the comparison unit, and the delay sampling unit is configured to perform sampling processing on the comparison result signal to generate the first pulse signal or the plurality of second pulse signals.

In a possible design, the configuration signal receiving unit includes a first switch and a second switch. A first end of the first switch is coupled to a third power supply level, a second end of the first switch is coupled to the optical-to-electrical conversion circuit, the second end of the first switch is coupled to a first end of the second switch, a second end of the second switch is coupled to the first end of the integration unit, and the third power supply level is less than the second power supply level. When the first switch is in a turn-off state and the second switch is in a turn-on state, the first current is transmitted to the integration unit; or when the first switch is in a turn-off state and the second switch is in a turn-on state, the first current is transmitted to the third power supply level.

In a possible design, the integration unit includes a first capacitor, a first electrode of the first capacitor is coupled to the optical-to-electrical conversion circuit through the second switch, and a second electrode of the first capacitor is coupled to the first level.

In a possible design, the comparison unit includes a comparator. A first input end of the comparator is coupled to the first end of the integration unit, and is configured to receive the measured voltage. A second input end of the comparator is coupled to the reference voltage. An output end of the comparator is coupled to the delay sampling unit, and is configured to output the comparison result signal. An initial voltage of the first electrode of the first capacitor may be the same as a ground level. In this case, a level of the comparison result signal output by the comparator is the second level.

In an example, in the first operating mode, a control end of the first switch receives a first drive signal, and the first drive signal is a fixed level signal and is used to drive the first switch to be in a turn-off state. The control end of the second switch receives a second drive signal, where the second drive signal is a fixed level signal and is used to drive the second switch to be in a turn-on state. Therefore, the first current generated by a photodiode may be transmitted to the first electrode of the first capacitor through the second switch. When the first electrode of the first capacitor is connected to a cathode of the photodiode, the first capacitor integrates the first current, and the voltage at the first electrode of the first capacitor increases. When the voltage at the first electrode of the first capacitor increases to the reference voltage, the level of the comparison result signal output by the comparator is the third level. After a delay time, the voltage at the first electrode of the first capacitor is reset to an initial level, so that the first capacitor starts a new integration process. In this case, the level of the comparison result signal output by the comparator changes to the second level.

In this embodiment of this application, that the comparator outputs a low level may be considered as that the comparator generates a reset valid level. In an integration process of the first capacitor, the voltage at the first electrode of the first capacitor increases from an initial voltage to the reference level, and the comparator outputs a low level. After the voltage at the first electrode of the first capacitor is reset to the initial voltage, the comparator outputs a high level. Therefore, the comparator generates a pulse. In the first operating mode, a quantity of pulses in the first pulse signal output by the comparator within a fixed time, that is, a frequency of the first pulse signal output by the comparator, may represent the intensity information of the incident light. The image signal processor may encode the intensity information of the incident light by using the frequency of the first pulse signal output by the comparator.

In another example, in the second operating mode, the control end of the first switch receives a third drive signal, the third drive signal is a periodic signal, and the first switch is configured to control the first switch to alternate between being in a turn-on state and being in a turn-off state based on a period of the third drive signal. A control end of the second switch receives the plurality of sampling signals, any sampling signal is a periodic signal, and the second switch is configured to control the second switch to alternate between being in a turn-on state and being in a turn-off state based on a period of each sampling signal. When the second switch is in a turn-on state, the first switch is in a turn-off state. If the optical-to-electrical conversion circuit outputs the first current, the first current may be transmitted to the first electrode of the first capacitor. When the first switch is in a turn-on state, the second switch is in a turn-off state. If the optical-to-electrical conversion circuit outputs the first current, the first current may be transmitted to the third power supply level. In some scenarios, the third drive signal and the sampling signal may be a pair of clock signals that are inverted. A frequency of the sampling signal is the same as a frequency of an optical fiber with a specified phase.

The control end of the second switch receives the plurality of sampling signals in a time division manner, and the comparator may output, in a time division manner, a second pulse signal corresponding to each sampling signal. The plurality of sampling signals have different phases. When the control end of the second switch receives a sampling signal whose phase is the first phase, the comparator outputs the second pulse signal corresponding to the first phase. In duration of a preset quantity of periods, a total quantity of pulses in the second pulse signal corresponding to the first phase represents an integral value corresponding to the first phase. The integral value corresponding to the phase of each sampling signal may be used to determine a phase offset between the phase of the incident light and the specified phase.

In a possible design, the delay sampling unit includes a D latch and an NOR gate circuit. A data input end of the D latch is coupled to the output end of the comparator, and is configured to receive the comparison result signal. A timing control input end of the D latch is configured to receive a first clock signal. A Q output end of the D latch is coupled to a first input end of the NOR circuit, and is configured to output a signal to the NOR circuit. A second input end of the NOR gate circuit is configured to receive the first clock signal. An output end of the NOR gate circuit is coupled to an image signal processor, and is configured to output the first pulse signal or the second pulse signal.

In a possible design, the composite measurement circuit further includes a reset switch. A first end of the reset switch is grounded, and a second end of the reset switch is coupled to the first end of the integration unit. A control end of the reset switch is coupled to the delay sampling unit, and is configured to receive the first pulse signal. In a time period in which a level of the first pulse signal is a fourth level, the reset switch is in a turn-off state; and in a time period in which a level of the first pulse signal is a fifth level, the reset switch is in a turn-on state, so that a voltage at the first end of the integration unit is a reset voltage, for example, a ground level. The fourth level is greater than the fifth level.

In a possible design, the composite measurement circuit further includes a read unit. The read unit is coupled to the delay sampling unit, and is coupled to the image signal processor. The read unit is configured to receive a storage signal provided by the image signal processor, and buffer the first pulse signal or the second pulse signal based on the storage signal. The read unit may receive a scanning signal provided by the image signal processor, and output a buffered signal to the image signal processor based on the scanning signal.

In a possible design, the read unit includes a third switch, a fourth switch, and an RS latch. A first end of the third switch is coupled to the image signal processor. A second end of the third switch is coupled to a first electrode of the fourth switch. A control end of the third switch is configured to receive the scanning signal provided by the image signal processor, where the scanning signal is used to drive the third switch to be in a turn-on state. A second electrode of the fourth switch is grounded, and a control end of the fourth switch is coupled to a Q output end of the RS latch. A reset end of the RS latch is coupled to the image signal processor, and is configured to receive the storage signal or the reset signal provided by the image signal processor. A set end of the RS latch is coupled to an output end of the delay sampling unit, and is configured to receive the first pulse signal. A level at the Q output end of the RS latch is the same as the level of the first pulse signal; or receive the second pulse signal, and a level at the Q output end of the RS latch is the same as a level of the second pulse signal.

In a possible design, the pixel further includes a dynamic visual measurement circuit, and the dynamic visual measurement circuit is coupled to the optical-to-electrical conversion circuit and to the image signal processor. The dynamic visual measurement circuit may generate a level indication signal based on the first current, and send the level indication signal to the image signal processor, where the level indication signal represents light intensity variation information of the incident light.

The pixel provided in this embodiment of this application may further provide intensity information of the incident light, the light intensity variation information of the incident light, and the time-of-flight information of the incident light. The pixel has a plurality of functions, so that the image sensor can serve more application scenarios.

In a possible design, the pixel further includes a current mirror circuit. The composite measurement circuit is coupled to the optical-to-electrical conversion circuit through the current mirror circuit. The current mirror circuit may be configured to provide the composite measurement circuit with the first current generated by the optical-to-electrical conversion circuit. In such a design, the first current is multiplexed and provided to the dynamic visual measurement circuit and the composite measurement circuit, so that the two circuits can operate synchronously. Isolation between the dynamic vision circuit and the composite measurement circuit is increased, and the mutual influence between the composite measurement circuit and the dynamic visual measurement circuit is reduced.

In a possible design, the optical-to-electrical conversion circuit includes a photodiode. An anode of the photodiode is coupled to a first power supply level, and a cathode of the photodiode is coupled to the composite measurement circuit and a second power supply level. The second power supply level is greater than the first power supply level.

In a possible design, a voltage of the first power supply level is less than zero. In this design, a current gain of the photodiode can be increased, so that the pixel can operate normally in a dark environment. In some application scenarios, materials with different absorbing wavelengths are selected as photodiodes, so that the pixel can process incident light of each band.

According to a second aspect, an embodiment of this application further provides an image sensor, where the image sensor may include an array of a plurality of pixels, and at least one pixel is a pixel in any possible design of the first aspect.

In a possible design, the image sensor may further include an image signal processor. The image signal processor is coupled to a composite measurement circuit. The image signal processor may control a target pixel to be in a first operating mode, where the target pixel is any pixel in the at least one pixel; and receive a first pulse signal, and determine, based on a frequency of the first pulse signal, intensity information of incident light incident on the target pixel.

In a possible design, the image signal processor is further configured to: control the target pixel to be in a second operating mode, and sequentially send, to the target pixel based on a plurality of preset phases, a plurality of sampling signals corresponding to the plurality of phases, where the plurality of phases are in a one-to-one correspondence with the plurality of sampling signals; receive a plurality of second pulse signals, where the plurality of sampling signals are in a one-to-one correspondence with the plurality of second pulse signals; and determine, based on each of the plurality of second pulse signals, a phase offset between a phase of the incident light incident on the target pixel and a specified phase, where the incident light is a reflected light ray that is of the specified phase and that is incident to a target object.

In a possible design, the image signal processor may determine a quantity corresponding to each second pulse signal, where the quantity corresponding to each second pulse signal is a quantity of rising edges of each second pulse signal in preset duration; determine the phase offset based on the quantity corresponding to the plurality of second pulse signals; and determine a distance between the target pixel and the target object based on the phase offset.

For technical effects that can be achieved in the second aspect, refer to descriptions of technical effects that can be achieved in any one of the first aspect and the possible designs of the first aspect. No repeated description is provided.

DESCRIPTION OF EMBODIMENTS

Figure 1:
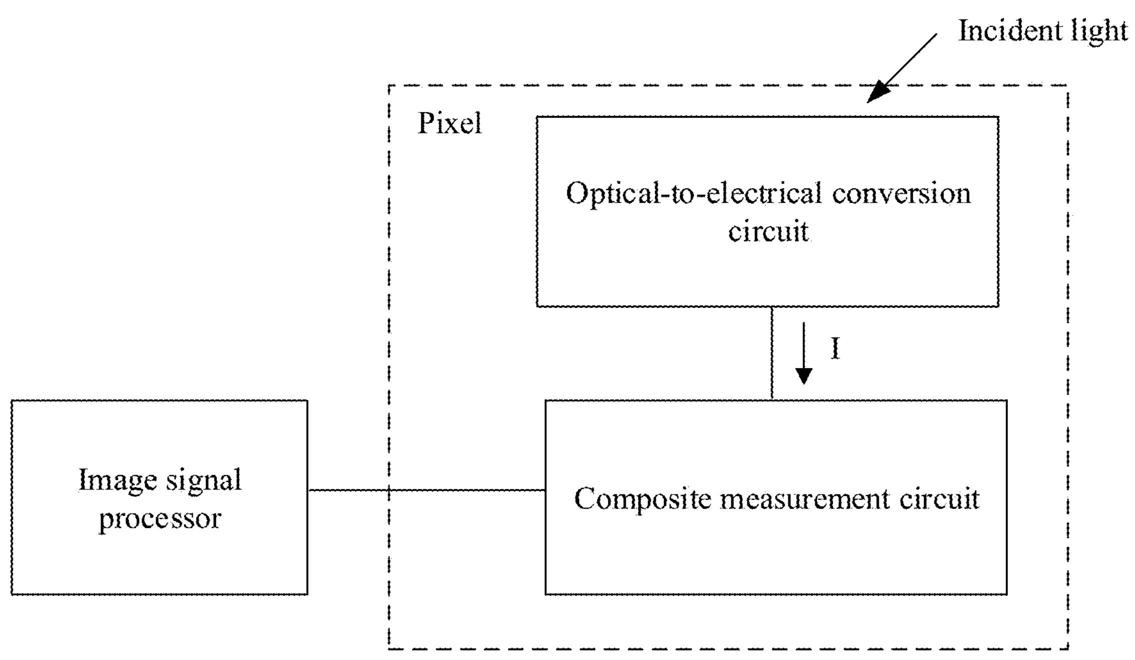
FIG. 1 is a schematic diagram of a structure of a pixel.

To make the objectives, technical solutions, and advantages of this application clearer, the following further describes this application in detail with reference to the accompanying drawings. A specific operation method in a method embodiment may also be applied to an apparatus embodiment or a system embodiment. It should be noted that, in the description of this application, "at least one" means one or more, and "a plurality of" means two or more. In view of this, in embodiments of this application, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In addition, it should be understood that in description of this application, terms such as "first" and "second" are merely used for distinguishing and description, but should not be understood as indicating or implying relative importance, or should not be understood as indicating or implying a sequence.

It should be noted that, "coupling" in embodiments of this application may be understood as an electrical connection, and coupling between two electrical elements may be direct or indirect coupling between the two electrical elements. For example, that A is connected to B may mean that A is directly coupled to B, or mean that A is indirectly coupled to B by using one or more other electrical elements. For example, that A is coupled to B may mean that A is directly coupled to C, C is directly coupled to B, and A is coupled to B by using C. In some scenarios, "coupling" may also be understood as connection. In short, coupling between A and B may enable electrical energy to be transmitted between A and B.

It should be noted that, the switching transistor and a switch in this embodiment of this application may be one or more of a plurality of types of switching transistors such as a relay, a metal oxide semiconductor field effect transistor (MOSFET), a bipolar junction transistor (BJT), and an insulated gate bipolar transistor (IGBT). The switching transistors are not enumerated in this embodiment of this application. Each switching transistor may include a first electrode (or a first end), a second electrode (or a second end), and a control electrode (or referred to as a control end), where the control electrode is configured to control on or off of the switching transistor. When the switching transistor is in a turn-on state, a current can be transmitted between the first electrode and the second electrode of the switching transistor. When the switching transistor is in a turn-off state, no current can be transmitted between the first electrode and the second electrode of the switching transistor. The MOSFET is used as an example. The control electrode of the switching transistor is a gate, the first electrode of the switching transistor may be a source of the switching transistor, and the second electrode may be a drain of the switching transistor. Alternatively, the first electrode may be a drain of the switching transistor, and the second electrode may be a source of the switching transistor.

In some cases, the switching transistor is in a turn-on state when driven by a high level, and the switching transistor is in a turn-off state when driven by a low level. In some other cases, the switching transistor is in a turn-on state when driven by a low level, and is in a turn-off state when driven by a low level. This is not limited in embodiments of this application. The following describes an example in which the switching transistor is in a turn-on state when driven by the high level and is in a turn-off state when driven by the low level. It should be understood that the high level and the low level are relative concepts, and a level (a voltage value) of the high level is greater than a level of the low level. In a digital circuit, 1 usually indicates a high level, and 0 usually indicates a low level. For different components in the circuit, levels of the high level may be the same or may be different. For ease of description, in this embodiment of this application, a high level may be 1.8 V, and a low level may be 0 V.

The following describes, with reference to the accompanying drawings, a pixel (or referred to as a pixel circuit) of an image sensor provided in this application. Refer to FIG. 1. An embodiment of this application provides a pixel of an image sensor, and the pixel may be coupled to an image signal processor. The pixel may include an optical-to-electrical conversion circuit and a composite measurement circuit. The pixel may be configured to convert light that is incident to the pixel into a corresponding electrical signal. The composite measurement circuit may be coupled to the optical-to-electrical conversion circuit. The optical-to-electrical conversion circuit may generate a first current based on incident light that is incident on the pixel. Optionally, the first current may also be referred to as a photocurrent, that is, a corresponding current converted by the optical-to-electrical conversion circuit from the incident light.

The pixel provided in this embodiment of this application has a plurality of operating modes respectively corresponding to a plurality of operating modes of the composite measurement circuit. In other words, the composite measurement circuit in the pixel provided in this embodiment of this application has a plurality of operating modes, to implement a plurality of functions of the pixel. Optionally, the composite measurement circuit may be driven by the image signal processor to switch the operating mode. The composite measurement circuit may receive the photocurrent from the optical-to-electrical conversion circuit, and then may detect two-dimensional information (for example, intensity information of the incident light) or three-dimensional information (for example, time-of-flight information of the incident light) of the incident light based on the photocurrent.

For example, when the pixel is in a first operating mode, the composite measurement current is used to detect the intensity information of the incident light. When the pixel is in a second operating mode, the composite measurement circuit may be configured to detect the time-of-flight information of the incident light. The following separately describes operating processes of the composite measurement circuit in different operating modes of the pixel.

The composite measurement circuit may generate a first pulse signal based on the first current when the pixel operates in the first operating mode, where the first pulse signal represents the intensity information of the incident light, so that the pixel can detect the two-dimensional information of the incident light. For example, the image signal processor may control the composite measurement circuit to operate in the first operating mode. The image signal processor may send a first operating mode control signal to the composite measurement circuit. The composite measurement circuit may generate the first pulse signal based on the first current in response to the first operating mode control signal.

The composite measurement circuit may receive a plurality of sampling signals when the pixel operates in the second operating mode, and generate a plurality of second pulse signals based on the first current and the plurality of sampling signals. The plurality of sampling signals are in a one-to-one correspondence with the plurality of second pulse signals. The plurality of second pulse signals represent a phase offset between a phase of the incident light and a specified phase. The incident light is a reflected light ray that is of the specified phase and that is incident to a target object. In this way, the pixel detects the three-dimensional information of the incident light. In this embodiment of this application, the three-dimensional information (that is, the time-of-flight information) of the incident light detected by the composite measurement current may be a phase offset between a phase of the incident light and a phase of an active light source. For example, the image signal processor may send a second operating mode control signal to the composite measurement circuit, where the second operating mode control signal may include a plurality of sampling signals, the plurality of sampling signals are periodic signals, and phases of the plurality of sampling signals are different. The image signal processor may sequentially send the sampling signals to the composite measurement circuit, and the composite measurement circuit may generate, in response to each received sampling signal, a second pulse signal corresponding to the sampling signal based on the first current and the received sampling signal. The second pulse signal corresponding to each sampling signal generated by the composite measurement circuit may represent a phase offset between the phase of the incident light and a specified phase (for example, the phase of the active light source). The image sensor is used in a three-dimensional information detection scenario, and after being reflected by a to-be-measured object, light emitted by the active light source is incident to the pixel of the image sensor. A frequency of the active light source is preconfigured, and the image signal processor may obtain the frequency of the active light source in advance.

The following briefly describes a process in which the image signal processor may determine a distance between the pixel and the to-be-measured object by using the phase offset. Active light source modulated by a sine wave is used as an example. The active light source may be denoted as r (t)=coswt. w is the phase specified above. The incident light is a light ray that is reflected after being incident by the active light source to the target object and is delayed, and the incident light may be denoted as s (t)=acos(wt−φ)+b, where φ is a phase offset between the incident light and the active light source.

In an implementation, the image signal processor may determine, based on a relationship between the preset phase offset and the distance, a distance corresponding to the detected phase offset. The relationship may be expressed as:

$$d = \frac{c \times \varphi}{2 \times 2\pi \times f\text{mod}},$$

where c is a speed of light, and fmod is the frequency of the active light source.

In another implementation, the image signal processor may determine, based on the relationship between the preset phase offset and the distance, the distance corresponding to the detected phase offset. The relationship is expressed as:

$$d = \frac{k \times c \times \varphi}{2 \times 2\pi \times f\text{mod}},$$

where c is the speed of light, fmod is the frequency of the active light source, and k is a refractive index.

The following describes in detail a plurality of operating modes of the pixel with reference to a pixel structure. In an implementation, the optical-to-electrical conversion circuit may include a photodiode (PD). The photodiode (PD) may be disposed between a first power supply level and a second power supply level, where the second power supply level is greater than the first power supply level. In a possible implementation, refer to FIG. 2. A cathode of the photodiode (PD) is coupled to a second power supply level (VDD1). An anode of the photodiode (PD) is coupled to a first power supply level (VSS), and the cathode of the photodiode (PD) is coupled to the composite measurement circuit. Optionally, the second power supply level (VDD1) may be 3.3 V. The first power supply level (VSS) may be less than zero, that is, less than a ground level. Such a design can improve a current gain of the optical-to-electrical conversion circuit.

Figure 2:
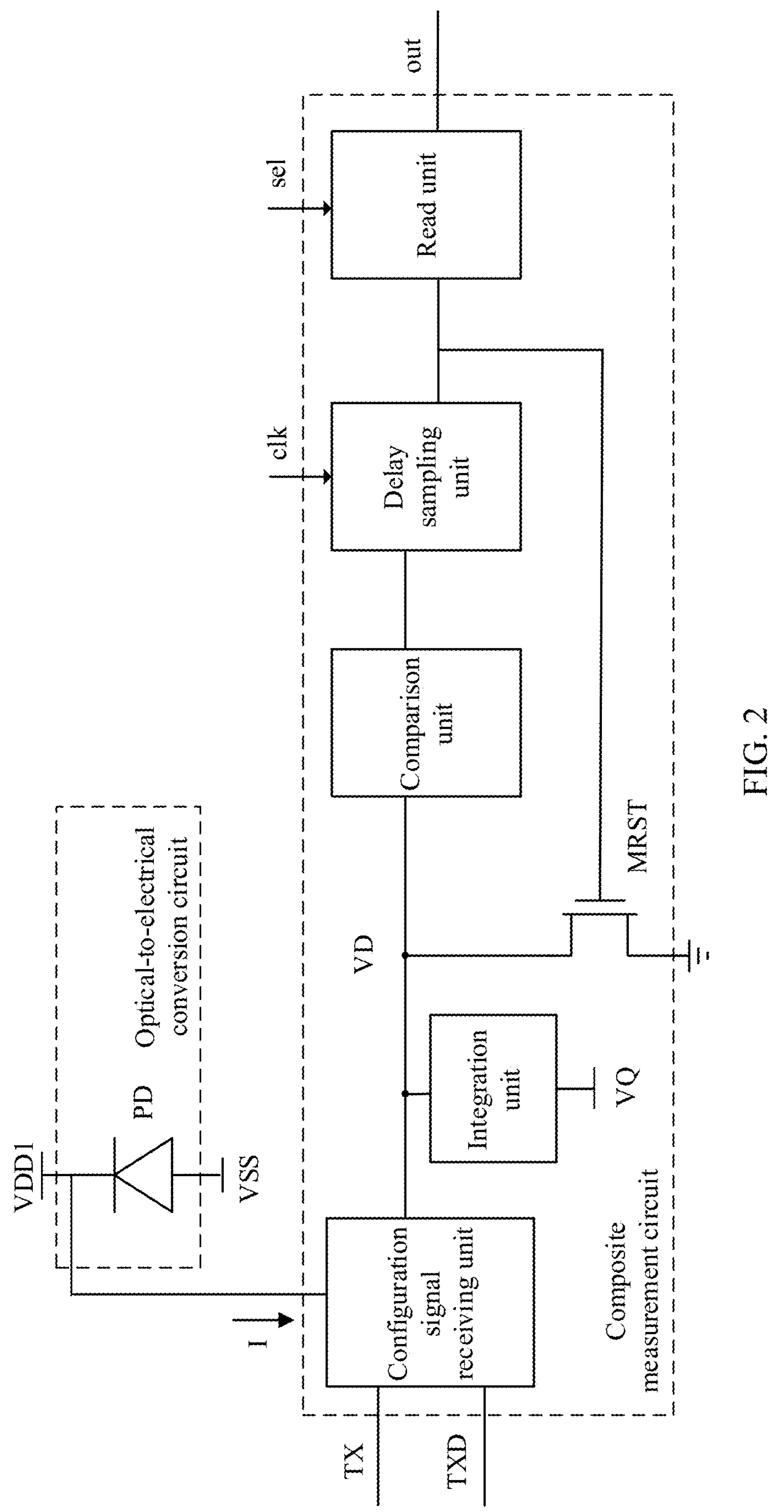
FIG. 2 is a schematic diagram of a specific structure of a pixel.

In an implementation, refer to FIG. 2. The composite measurement circuit may include a configuration signal receiving unit, an integration unit, a comparison unit, and a delay sampling unit. A first end of the configuration signal receiving unit is coupled to the optical-to-electrical conversion circuit, for example, coupled to the cathode of the photodiode (PD). A second end of the configuration signal receiving unit is coupled to a first end of the integration unit and an input end of the comparison unit.

When the pixel is in the first operating mode, the configuration signal receiving unit may receive the first operating mode control signal, and turn on the optical-to-electrical conversion circuit and the integration unit, so that the configuration signal receiving unit receives the first current and outputs the first current to the integration unit.

When the pixel is in the second operating mode, the configuration signal unit may receive each sampling signal, and periodically turn on the optical-to-electrical conversion circuit and the integration unit based on a signal period of the sampling signal, so that the configuration signal receiving unit periodically outputs the first current to the integration unit.

As shown in FIG. 2, the first end of the integration unit is coupled to the second end of the configuration signal receiving unit, the first end of the integration unit is coupled to the comparison unit, and a second end of the integration unit is coupled to a first level (VQ). The first level (VQ) may be a fixed voltage. Optionally, the first level (VQ) may be a ground level, or the second end of the integration unit may be grounded. The integration unit may receive the first current output by the configuration signal receiving unit. The integration unit may be configured to integrate the received first current to obtain a measured voltage, and provide the measured voltage to the comparison unit. A node VD is shown in FIG. 2. The node VD may be any point between the second end of the configuration signal receiving unit and the comparison unit. The integration unit integrates the first current, and may change a voltage at the node VD, where the voltage at the node VD is the foregoing measured voltage.

As shown in FIG. 2, the input end of the comparison unit may be coupled to the first end of the integration unit, and an output end of the comparison unit may be coupled to the delay sampling unit. The comparison unit may receive the measured voltage, compare the measured voltage with a preset reference voltage, and output (send) a comparison result signal to the delay sampling unit. When the measured voltage is less than a reference level, the comparison unit may output a level of the comparison result signal as the second level. When the measured voltage is greater than or equal to the reference level, the level of the comparison result signal is a third level, where the second level is greater than the third level.

The comparison result signal output by the comparison unit is an analog signal, so that a signal output by the comparison unit is denoted as a first analog signal for distinguishing. It can be learned from the foregoing description that a level of the first analog signal in a time period in which the measured voltage is less than the reference voltage is the second level, and a level of the first analog signal in a time period in which the measured voltage is greater than or equal to the reference voltage is a third level.

The delay sampling unit is coupled to the output end of the comparison unit, and the delay sampling unit is coupled to the image signal processor. The delay sampling unit may perform delay sampling processing on the signal output by the comparison unit, to generate the first pulse signal or the second pulse signal. The delay sampling unit may receive a first clock signal (clk) provided by the image signal processor, and sample, based on the first clock signal (clk), the signal output by the comparison unit. The delay sampling unit may convert an analog signal into a digital signal, and in a given period, the delay sampling unit outputs a pulse. Such a design can meet a time requirement of the image signal processor.

When the pixel operates in the first operating mode, a pulse signal obtained after the delay sampling unit samples, based on the first clock signal (clk), the signal output by the comparison unit is the first pulse signal. When the pixel operates in the second operating mode, a pulse signal obtained after the delay sampling unit samples, based on the first clock signal (clk), the signal output by the comparison unit is the second pulse signal.

Figure 3:
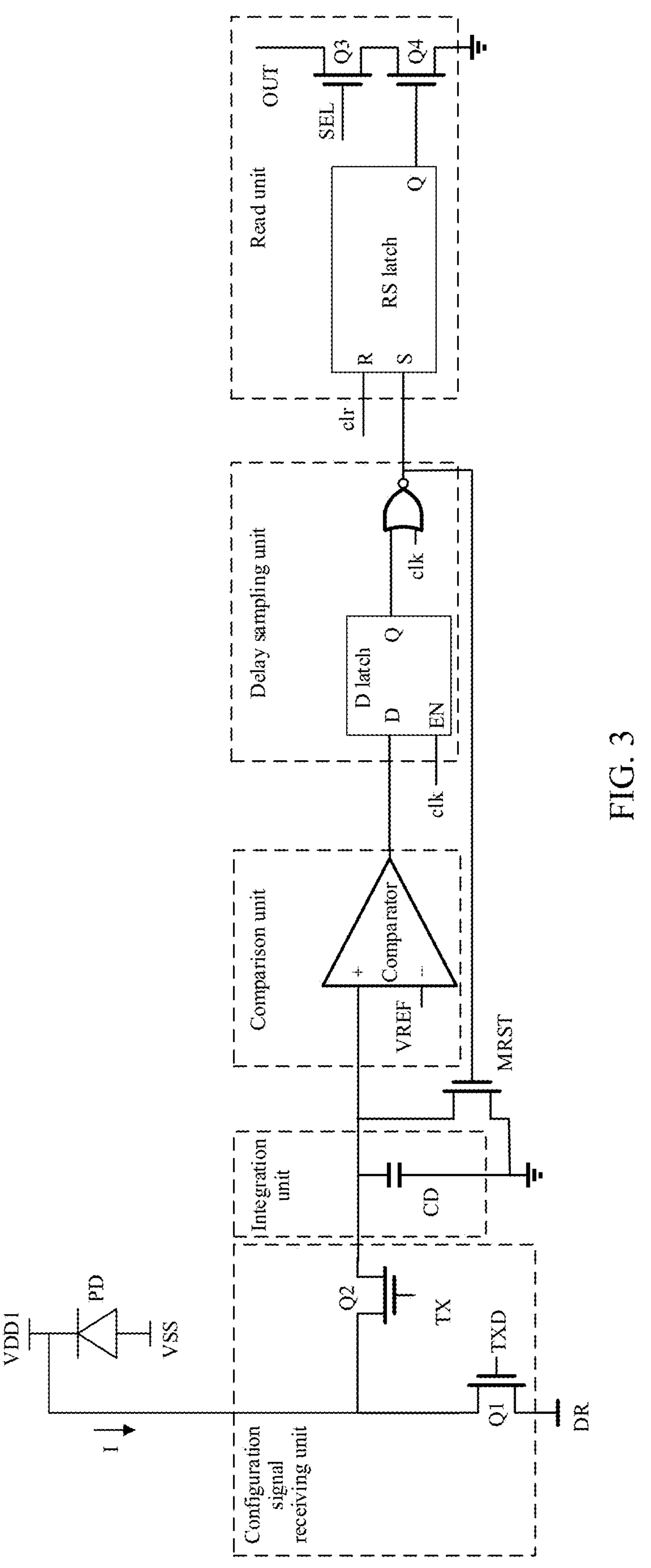
FIG. 3 is a schematic diagram of a specific structure of a composite measurement circuit in a pixel.

In a possible implementation, refer to FIG. 3. The configuration signal receiving unit may include a first switch (Q1) and a second switch (Q2). A first end of the first switch (Q1) is coupled to a third power supply level (DR), a second end of the first switch (Q1) is coupled to the anode of the photodiode (PD), and the second end of the first switch (Q1) is coupled to a first end of the second switch (Q2). A control end of the first switch (Q1) is coupled to the image signal processor. A second end of the second switch (Q2) is coupled to the first end of the integration unit. A control end of the second switch (Q2) is coupled to the image signal processor.

In an implementation, still refer to FIG. 3. The integration unit may include an integration device. In some examples, the integration unit may include a first capacitor (CD). A first electrode of the first capacitor (CD) is coupled to the optical-to-electrical conversion circuit, and a second electrode of the first capacitor (CD) is grounded. For example, the first electrode of the first capacitor (CD) is coupled to the anode of the photodiode (PD) through the second switch (Q2). When the second switch (Q2) is in a turn-on state, the anode of the photodiode (PD) may be connected to the first electrode of the first capacitor (CD). When the second switch (Q2) is in a turn-off state, the anode of the photodiode (PD) may be disconnected from the first electrode of the first capacitor (CD). The first electrode of the first capacitor (CD) may be implemented as the first end of the integration unit, and the second electrode of the first capacitor (CD) may be implemented as the second end of the integration unit.

Figure 4:
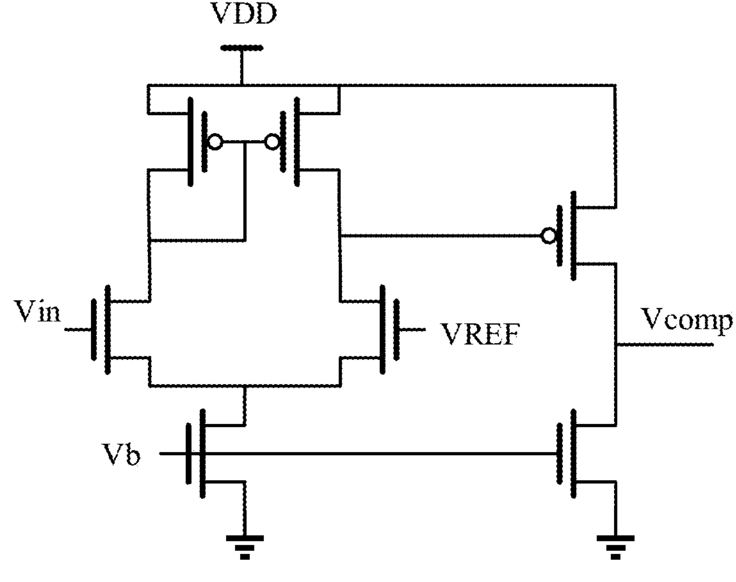
FIG. 4 is a schematic diagram of a specific structure of a comparator.

In an implementation, still refer to FIG. 3. The comparison unit includes a first comparator. A first input end of the first comparator is coupled to the first end of the integration unit, a second input end of the first comparator receives a reference level (VREF), and an output end of the first comparator is configured to output the first analog signal. The first comparator may be any comparator that can implement a function of the foregoing comparison unit. FIG. 4 shows a diagram of a circuit structure of a first comparator according to an example embodiment, where a voltage of a power level VDD of the first comparator may be 1.8 V. A Vin terminal shown in FIG. 4 may be the input end of the first comparator, and may be coupled to the first electrode of the first capacitor (CD). A Vref terminal is coupled to the reference level. A Vb terminal is coupled to the fixed voltage. A Vcomp terminal is the output end of the first comparator.

Figure 5:
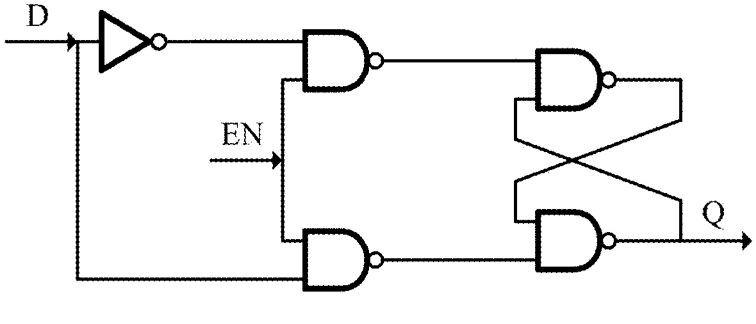
FIG. 5 is a schematic diagram of a specific structure of a D latch.

In a possible implementation, still refer to FIG. 3. The delay sampling unit may include a D latch and an NOR gate circuit. In this embodiment of this application, the D latch may be any D latch. The D latch usually has a data input end (D), a timing control input end (EN), and a Q output end. When the EN is of a high level, a level of the Q output end changes with a level of the data input end (D). When the timing control input end (EN) is of a low level, the level of the Q output end does not change an output state. FIG. 5 is a diagram of an example of a circuit structure of a D latch.

The data input end (D) of the D latch is coupled to the output end of the first comparator, and is configured to receive the first analog signal. The timing control input end (EN) of the D latch is coupled to the image signal processor, and is configured to receive the first clock signal (clk). The NOR gate circuit is configured to perform NOR processing on two input signals, and output a processed signal. The following describes how the NOR gate circuit performs NOR processing. If both the input signals are low levels, the NOR gate circuit outputs a high level. If the two input signals are both high levels (or the two input signals are respectively a high level and a low level), the NOR gate circuit outputs a low level.

A first input end of the NOR gate circuit is coupled to the Q output end of the D latch, and is configured to output a signal to the NOR gate circuit. A second input end of the NOR gate circuit is coupled to the image signal processor, and is configured to receive the first clock signal (clk). The NOR gate circuit may perform NOR processing on the signal output by the Q output end of the D latch and the first clock signal (clk), and then generate a pulse signal. An output end of the NOR gate circuit may be coupled to the image signal processor to output a pulse signal. When the pixel is in the first operating mode, the NOR gate circuit outputs the first pulse signal. When the pixel is in the second operating mode, the NOR gate circuit outputs the second pulse signal.

With reference to a specific circuit structure of a pixel shown in FIG. 3, the following describes an operating process of the composite measurement circuit of the pixel in the first operating mode. The image signal processor may send the first operating mode control signal to the composite measurement circuit, and the first operating mode control signal may include a first drive signal and a second drive signal. In the configuration signal receiving unit, the control end of the first switch (Q1) is configured to receive the first drive signal, and the control end of the second switch (Q2) is configured to receive the second drive signal. Both the first drive signal and the second drive signal are fixed level signals. The first drive signal may drive the first switch (Q1) to be in a turn-off state, and the second drive signal may drive the second switch (Q2) to be in a turn-on state. Therefore, a first current (I) generated by the photodiode (PD) may be transmitted to the first electrode of the first capacitor (CD) through the second switch (Q2).

The configuration signal receiving unit may keep the optical-to-electrical conversion circuit connected to the integration unit under control of the first drive signal and the second drive signal, so that the first current can be continuously input to the integration unit. The first capacitor (CD) may be used as an integration capacitor. When the first electrode of the first capacitor (CD) is connected to the cathode of the photodiode (PD), the first capacitor (CD) integrates the first current (I), and a voltage (VFD) at the node VD changes, so that the node VD is denoted as an integration node. That the first capacitor (CD) integrates the first current (I) is actually that the first current (I) charges the first capacitor (CD).

An initial voltage of the integration node may be the same as a ground level. In this case, a level of the comparison result signal output by the first comparator is the second level. When the configuration signal receiving unit outputs the first current to the integration unit, the first capacitor (CD) integrates the first current. When the first capacitor (CD) integrates the first current, the voltage (VFD) at the integration node increases. When the level at the integration node increases to the reference voltage, the level of the comparison result signal output by the first comparator is the third level. After a delay time, the voltage (VFD) at the integration node is reset to an initial level, so that the first capacitor (CD) starts a new integration process. In this case, the level of the comparison result signal output by the first comparator changes to the second level. In this embodiment of this application, the first comparator outputting a low level may be considered as that the first comparator generates a reset valid level. It can be learned that, in an integration process of the first capacitor (CD), the voltage (VFD) at the integration node increases from an initial voltage to the reference level, and the first comparator outputs a low level. After the voltage (VFD) at the integration node is reset to the initial voltage, the first comparator outputs a high level. Therefore, the first comparator generates a pulse. A quantity of pulses output by the first comparator within a fixed time is a frequency of the pulses output by the first comparator. The frequency of the pulse output by the first comparator may represent the intensity information of the incident light. The image signal processor may encode the intensity information of the incident light based on the frequency of the pulse output by the first comparator. Because the composite measurement circuit outputs one first pulse signal in the first operating mode, grayscale data has only one bit.

In the pixels provided in this embodiment of this application, a larger light intensity of incident light indicates a larger generated first current, and integration time of the first capacitor (CD) between the initial level and the reference level is shorter. In this case, a frequency at which the first comparator generates a reset valid level (that is, generates a pulse) within a specific time is higher. The image signal processor may count a quantity of times that the first comparator outputs the valid reset level within fixed time. The quantity of times may represent light intensity information of the incident light, that is, the intensity information of incident light. In this way, a manner of detecting an intensity of light in the frequency domain may also be referred to as a grayscale pulse imaging technology.

With reference to a specific circuit structure of a pixel shown in FIG. 3, the following describes an operating process of the composite measurement circuit of the pixel in the second operating mode. The image signal processor may send the second operating mode control signal to the composite measurement circuit, and the second operating mode control signal may include a third drive signal and a fourth drive signal. In the configuration signal receiving unit, the control end of the first switch (Q1) is configured to receive the third drive signal, and the control end of the second switch (Q2) is configured to receive the fourth drive signal. The third drive signal is configured to drive the first switch (Q1), and the fourth drive signal is configured to drive the second switch (Q2). Both the third drive signal and the fourth drive signal are periodic signals. When the second switch (Q2) is in a turn-on state, the first switch (Q1) is in a turn-off state; and when the first switch (Q1) is in a turn-on state, the second switch (Q2) is in a turn-off state. In some examples, the third drive signal and the fourth drive signal may be a pair of clock signals that are inverted.

Both the third drive signal and the fourth drive signal that are provided by the image signal processor to the composite measurement circuit are periodic square wave signals, and a frequency of the third drive signal and the fourth drive signal is the same as a frequency of the active light source. Driven by the third drive signal, the first switch (Q1) may be periodically in a turn-on state. Driven by the fourth drive signal, the second switch (Q2) may be periodically in a turn-on state. The second switch (Q2) is in a turn-on state, the first switch (Q1) is in a turn-off state, and the first current (I) is transmitted to the integration node. The second switch (Q2) is in a turn-off state, the first switch (Q1) is in a turn-on state, and the first current is completely transmitted to the DR. Driven by the fourth drive signal, the second switch (Q2) alternates between being in a turn-on state and being in a turn-off state, and has a gating function. The fourth drive signal may be the foregoing sampling signal, and is denoted as g (t). The sampling signal g (t) may drive the second switch (Q2) to alternate between being in a turn-on state and being in a turn-off state. (a) in FIG. 6 shows an example of a waveform of a sampling signal in duration corresponding to a period T, $$g(t) = \begin{cases} 1, & |t| < k0/2 \\ 0, & k0/2 < |t| < T/2 \end{cases},$$

where k0 and T are both preconfigured constants. For example, in a period, when $-k0/2<t<k0/2$, if the optical-to-electrical conversion circuit generates the first current, the second switch (Q2) may transmit the first current to the first capacitor (CD). At another moment in the period T, if the optical-to-electrical conversion circuit generates the first current, the second switch (Q2) does not transmit the first current to the first capacitor (CD). It should be noted that a sampling signal g(t) shown in (a) in FIG. 6 is used to describe, by using an example, a gating function of the second switch (Q2) under control of the fourth drive signal, and is not used as a specific limitation on the sampling signal. In an actual application scenario, the sampling signal is a periodic signal, and in each period, a moment at which a level in the sampling signal is converted from a low level to a high level (referred to as a phase of the sampling signal in this application) is adjustable.

Figure 6:
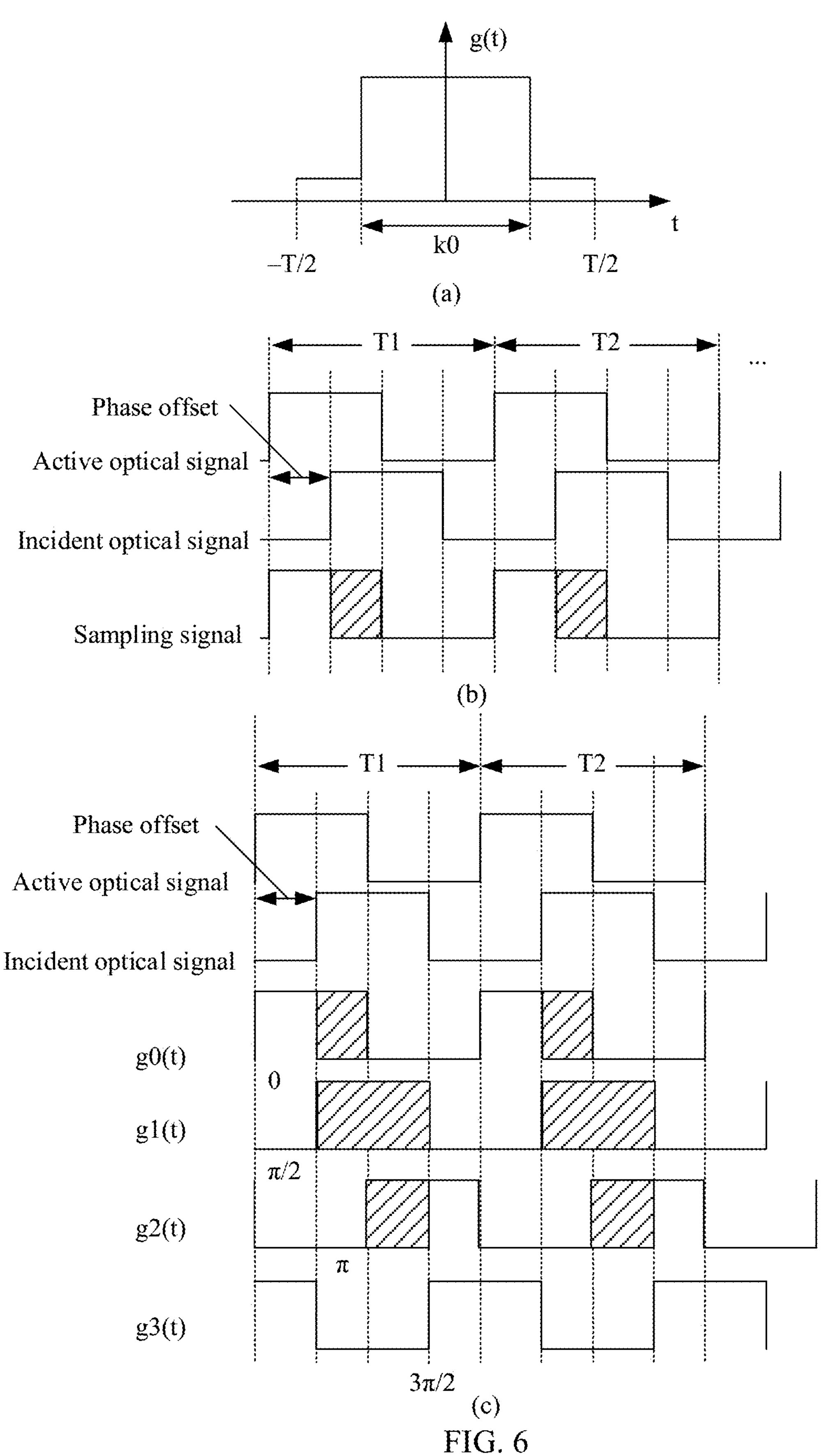
FIG. 6 is a schematic diagram of a sampling signal according to an example embodiment.

As shown in (b) in FIG. 6, light obtained after an active optical signal is reflected by the target object is incident to a pixel. An optical signal that is incident to the pixel is denoted as an incident optical signal. Compared with the active optical signal, a frequency of the incident optical signal does not change, and is the same as a frequency of the active optical signal. A phase and an amplitude of the incident optical signal may change and may be different from those of the active optical signal. The fourth drive signal is a control signal that drives the second switch (Q2), and a time period of a high level in the fourth drive signal is a time period in which the second switch (Q2) is in a turn-on state. A time period of a low level in the fourth drive signal is a time period in which the second switch (Q2) is in a turn-off state. The second switch (Q2) has a gating function under control of the fourth drive signal. The first current (I) may be transmitted to the first capacitor (CD) only when the second switch (Q2) is in a turn-on state, to charge the first capacitor (CD), so that an optoelectronic is stored in the first capacitor (CD), thereby implementing integration of the first current by the first capacitor (CD). A shadow part of (b) in FIG. 6 is a corresponding time period in which the first current is transmitted to the first capacitor (CD).

In a preset quantity of periods (for example, a period T of the fourth drive signal), the first capacitor (CD) integrates the first current in each period, and a total quantity of pulses output by the first comparator represents an integration value of the first current in corresponding time within the preset quantity of periods (for example, hundreds of periods).

The image signal processor may adjust a phase of the fourth drive signal, that is, the image signal processor may provide the fourth drive signal with a plurality of phase combinations, for example, provide four phase combinations, and any two phases in the four phase combinations are orthogonal.

The fourth drive signal may be the foregoing sampling signal. The image signal processor provides a sampling signal to the second switch (Q2), and drives the second switch (Q2) to alternate between being in a turn-on state and being in a turn-off state. When the second switch (Q2) is in a turn-on state, the first current is transmitted to the integral capacitor (CD). When the second switch (Q2) is in a turn-off state, the first current cannot be transmitted to the integral capacitor (CD). Under control of the sampling signal, the second switch (Q2) is in a turn-on state, so that the integration capacitor integrates the first current. In this process, cross-correlation processing between the sampling signal g (t) and the incident optical signal s (t) may be implemented. A processed signal may be represented by C (t), and a mathematical expression of the processed signal is:

$$C(\tau) = \int_{-\frac{\pi}{2}}^{\frac{\pi}{2}} s(t)g(t+\tau)dt = ak_0\mathrm{sinc}\left(\frac{wk_0}{2}\right)\cos(w\tau+\varphi) + bk_0,$$

where k0 is a preconfigured constant.

Phases of sampling signals in the plurality of sampling signals provided by the image signal processor are different. Refer to (c) in FIG. 6. The following uses an example in which the plurality of sampling signals are respectively $g_0(t)$, $g_1(t)$, $g_2(t)$, and $g_3(t)$ for description. Phases of $g_0(t)$, $g_1(t)$, $g_2(t)$, and $g_3(t)$ may be respectively 0, π/2, π, and 3π/2. The image signal processor provides sampling signals to the second switch (Q2) in a time-sharing manner. As shown in (c) in FIG. 6, it is assumed that a phase of an incident optical signal is π/2, and sampling signals of different phases have different gating functions. For example, in a period T, the second switch (Q2) transmits the first current to the first capacitor (CD) in a time period of a shadow part of a waveform of the sampling signal $g_0(t)$, and duration for transmitting the first current by the second switch (Q2) is T/4. The second switch (Q2) transmits the first current to the first capacitor (CD) in a time period of a shadow part of a waveform of the sampling signal $g_1$ (t), and duration for transmitting the first current by the second switch (Q2) is T/2. The second switch (Q2) transmits the first current to the first capacitor (CD) in a time period of a shadow part of a waveform of the sampling signal $g_2(t)$, and duration for transmitting the first current by the second switch (Q2) is T/4. Under control of the second switch (Q2) by the sampling signal $g_3(t)$, duration for transmitting the first current by the second switch (Q2) is 0.

In $$C(\tau) = \int_{-\frac{\pi}{2}}^{\frac{\pi}{2}} s(t)g(t+\tau)dt,$$

when the sampling signal is $g_0(t)$, the sampling signal is a cross correlation function value $$C_0 = ak_0\mathrm{sinc}\left(\frac{wk_0}{2}\right)\cos(\varphi) + bk_0$$

between $g_0(t)$ and the incident optical signal s(t). When the sampling signal is $g_1(t)$, the sampling signal is a cross correlation function value $$C_1 = -ak_0\mathrm{sinc}\left(\frac{wk_0}{2}\right)\sin(\varphi) + bk_0$$

between $g_1(t)$ and the incident optical signal s(t). When the sampling signal is $g_2(t)$, the sampling signal is a cross correlation function value $$C_2 = -ak_0\mathrm{sinc}\left(\frac{wk_0}{2}\right)\cos(\varphi) + bk_0$$

between $g_2(t)$ and the incident optical signal s(t). When the sampling signal is $g_3(t)$, the sampling signal is a cross correlation function value $$C_3 = ak_0 \sin c\left(\frac{wk_0}{2}\right)\sin(\varphi) + bk_0$$

between $g_3(t)$ and the incident optical signal s(t).

When the sampling signal $g_0(t)$ is input, the second switch (Q2) is periodically in a turn-on state under control of the sampling signal $g_0(t)$, and the first comparator outputs the second pulse signal corresponding to the sampling signal $g_0(t)$. In duration of a preset quantity of periods (a period of the sampling signal), a total quantity (a total quantity of rising edges) of pulses in the second pulse signal corresponding to the sampling signal $g_0(t)$ represents the cross correlation function value $C_0$ corresponding to the sampling signal $g_0(t)$, and is also a cross correlation function value $C_0$ corresponding to a phase of the sampling signal $g_0(t)$.

Similarly, when the sampling signal $g_1$ (t) is input, the second switch (Q2) is periodically in a turn-on state under control of the sampling signal $g_1$ (t), and the first comparator outputs the second pulse signal corresponding to the sampling signal $g_1$ (t). In duration of the preset quantity of periods (the period of the sampling signal), the total quantity (the total quantity of rising edges) of pulses in the second pulse signal corresponding to the sampling signal $g_1$ (t) represents the cross correlation function value $C_1$ corresponding to the sampling signal $g_1$ (t), and is also the cross correlation function value $C_1$ corresponding to the phase of the sampling signal $g_1$ (t).

Similarly, when the sampling signal $g_2(t)$ is input, the second switch (Q2) is periodically in a turn-on state under control of the sampling signal $g_2(t)$, and the first comparator outputs the second pulse signal corresponding to the sampling signal $g_2(t)$. In duration of the preset quantity of periods (the period of the sampling signal), the total quantity (the total quantity of rising edges) of pulses in the second pulse signal corresponding to the sampling signal $g_2(t)$ represents the cross correlation function value $C_2$ corresponding to the sampling signal $g_2(t)$, and is also the cross correlation function value $C_2$ corresponding to the phase of the sampling signal $g_2(t)$.

Similarly, when the sampling signal $g_3(t)$ is input, the second switch (Q2) is periodically in a turn-on state under control of the sampling signal $g_3(t)$, and the first comparator outputs the second pulse signal corresponding to the sampling signal $g_3(t)$. In duration of the preset quantity of periods (the period of the sampling signal), the total quantity (the total quantity of rising edges) of pulses in the second pulse signal corresponding to the sampling signal $g_3(t)$ represents the cross correlation function value $C_3$ corresponding to the sampling signal $g_3(t)$, and is also the cross correlation function value $C_3$ corresponding to the phase of the sampling signal $g_3(t)$.

The image signal processor may determine, based on the received second pulse signal corresponding to each sampling signal, a cross correlation function value corresponding to each sampling signal. The image signal processor determines a phase offset based on the cross correlation function value corresponding to the sampling signal, where $$\varphi = \arctan\left(\frac{C_3 - C_1}{C_0 - C_2}\right).$$

Refer to FIG. 2 again. To facilitate resetting of a voltage at the integration node, the composite measurement circuit may further include a reset switch (MRST), where a first end of the reset switch (MRST) is grounded, and a second end is coupled to the first end of the integration unit. A control end of a reset switch (MRST) and the output end of the delay sampling unit are coupled. Refer to FIG. 3. A second end of a reset switch (MRST) may be coupled to the first electrode of the first capacitor (CD), and the control end of the reset switch (MRST) may be coupled to the output end of the NOR gate circuit. The reset switch (MRST) may alternate between being in a turn-on state and being in a turn-off state under control of the pulse signal output by the delay sampling unit. The reset switch (MRST) is in a turn-on state, so that the voltage at the first end of the integration unit can be reset to an initial voltage, that is, 0 V. In other words, the voltage (VFD) at the integration node can be reset to the initial voltage when the reset switch (MRST) is in a turn-on state.

For example, when the D latch may sample, at a high level edge (a rising edge) of the first clock signal (clk), a falling edge (or referred to as a negative pulse, that is, an edge at which a high level jumps to a low level) of the first analog signal generated by the first comparator, a level output by the Q output end is a low level. In a low level period of the first clock signal (clk), when the signal output by the Q output end is a low level, the level of the first pulse signal output by the NOR gate circuit is a high level, and the reset switch (MRST) may be driven to be in a turn-on state, so that the level at the integration node is reset and restored to the initial level, for example, 0 V.

In a possible design, refer to FIG. 2. The composite measurement circuit may further include a read unit. The read unit is coupled to the delay sampling unit, and is coupled to the image signal processor. The read unit may buffer, driven by a storage signal (clr=0) provided by the image signal processor, a signal output by the delay sampling unit, for example, the first pulse signal or the second pulse signal. Driven by a selection signal (sel) provided by the image signal processor, a buffered signal is output to the image signal processor through an output end (out) of the read unit. Alternatively, driven by a reset signal (clr=1) provided by the image signal processor, a signal output to the image signal processor is reset.

In some examples, refer to FIG. 3. The read unit may include a third switch (Q3), a fourth switch (Q4), and an RS latch. A first end of the third switch (Q3) may be coupled to the image signal processor through an output end (out) of the read unit. Alternatively, the first end of the third switch (Q3) may be used as the output end (out) of the read unit. A second end of the third switch (Q3) is coupled to a first electrode of the fourth switch (Q4), a control end of the third switch (Q3) is configured to receive a selection signal (sel), and the selection signal is used to drive the third switch (Q3) to be in a turn-on state. A second electrode of the fourth switch (Q4) is grounded, and a control end of the fourth switch (Q4) is coupled to a Q output end of the RS latch. A reset end (R) of the RS latch is coupled to the image signal processor, and may be configured to receive the storage signal or the reset signal (clr=1). A set end(S) of the RS latch is coupled to the output end of the NOR gate circuit, and is configured to receive the first pulse signal or the second pulse signal.

The RS latch has a level recording function. The image signal processor may provide the storage signal to the reset end (R) of the RS latch, to drive the level recording function of the RS latch. The storage signal may be a fixed level signal, and a level of the storage signal (clr=0) may be a low level (0), so that the RS latch can latch a level of a positive pulse (a rising edge) of a signal (that is, the first pulse signal)

at the set end(S). When the level at the set end(S) changes from a low level to a high level, the RS latch latches the level of the set end(S), a level state of the Q output end of the RS latch is a high level, and the output high level is maintained.

Figure 7:
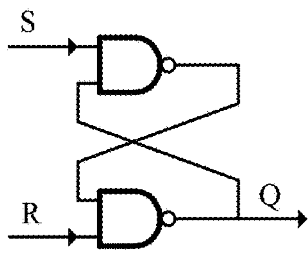
FIG. 7 is a schematic diagram of a specific structure of an RS latch.

The image signal processor may provide the reset signal to the reset end (R) of the RS latch, and drive the RS latch to reset, so that initial output of the RS latch is 0. The reset signal may be a fixed level signal, and a level of the reset signal (clr=1) may be a high level (1), so that an output level state of the RS latch is a low level. In this case, when the image signal processor sends the storage signal to the RS latch, the RS latch may record the level. FIG. 7 shows a circuit diagram of an RS latch according to an example embodiment.

The control end of the fourth switch (Q4) is coupled to the Q output end of the RS latch. The Q output end of the RS latch outputs a high level, to drive the fourth switch (Q4) to be in a turn-on state. The Q output end of the RS latch outputs a low level, to drive the fourth switch (Q4) to be in a turn-off state. Therefore, after the RS latch records the high level of the first pulse signal, the fourth switch (Q4) is in a turn-on state.

The image signal processor provides a selection signal (sel) for the third switch (Q3), so that the third switch (Q3) is in a turn-on state driven by the selection signal (sel), and the fourth switch (Q4) may be connected to the image signal processor. The fourth switch (Q4) may be coupled to a bus pull-up resistor.

If the third switch (Q3) is in a turn-on state driven by the selection signal (sel), and when the fourth switch (Q4) is in a turn-on state, the first end (which may also be considered as an output end of a pixel) of the third switch (Q3) has level output. When the fourth switch (Q4) is in a turn-off state, the first end of the third switch (Q3) has no level output. If the image signal processor does not provide the selection signal (sel) to the third switch (Q3), the third switch (Q3) is in a turn-off state, and the first end of the third switch (Q3) has no level output.

Figure 8:
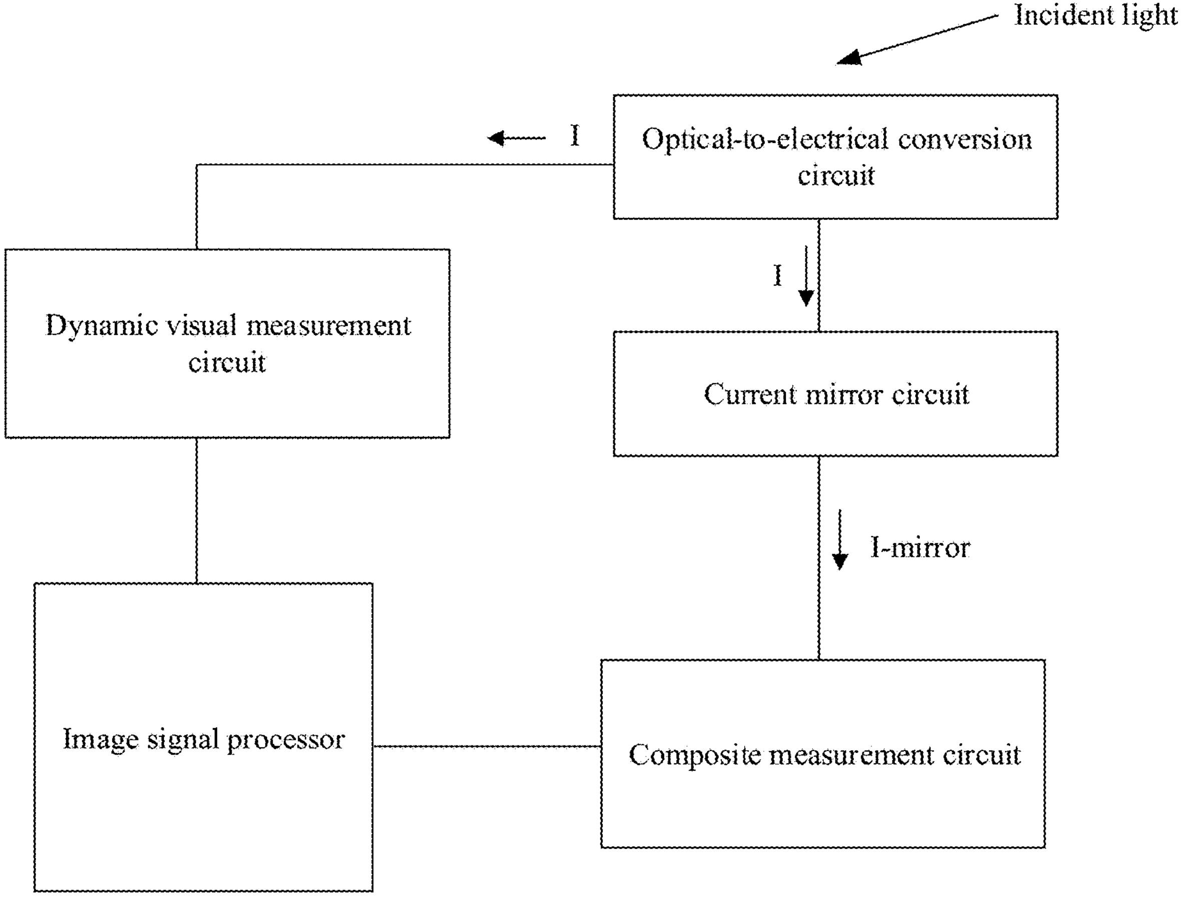
FIG. 8 is a schematic diagram of a structure of another pixel.

In the first operating mode, the pixel provided in this embodiment of this application may provide light intensity variation information. However, when a position of the measured object or a state of the object changes, the intensity of the light incident to the pixel also changes accordingly. Based on this, in a possible implementation, the pixel provided in this embodiment of this application may further include a dynamic visual measurement circuit. Refer to FIG. 8. The dynamic visual measurement circuit may be coupled to the optical-to-electrical conversion circuit, and the dynamic visual measurement circuit may provide, based on the first current generated by the optical-to-electrical conversion circuit, the image signal processor with the light intensity variation information of the incident light. The dynamic visual measurement circuit may compress the light intensity of the incident light in a logarithmic domain, and sense a change of the measured object, that is, sense an image point with a sharp change.

Refer to FIG. 8. An embodiment of this application may further include a current mirror circuit. The composite measurement circuit is coupled to the optical-to-electrical conversion circuit through the current mirror circuit. The current mirror circuit may provide the composite measurement circuit with a current generated by the optical-to-electrical conversion circuit. In such a design, the first current generated by the optical-to-electrical conversion circuit can be used by two circuits, that is, the composite measurement circuit and the dynamic visual measurement circuit. In addition, the current mirror circuit may increase isolation between the composite measurement circuit and the dynamic visual measurement circuit, and reduce impact between the composite measurement circuit and the dynamic visual measurement circuit.

Figure 9:
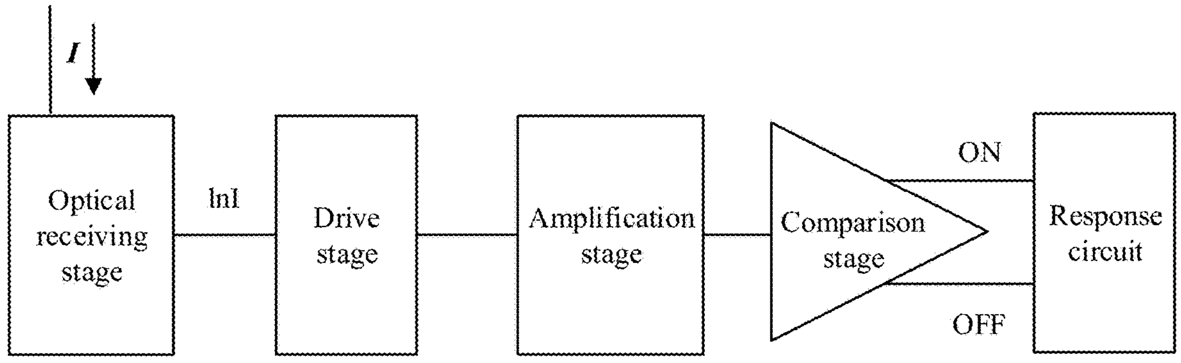
FIG. 9 is a schematic diagram of a structure of a dynamic visual measurement circuit.

In a possible implementation, refer to FIG. 9. The dynamic visual measurement circuit may include an optical receive stage, a drive stage, an amplification stage, a comparison stage, and a response circuit. The optical receive stage may convert the first current into a logarithmic domain. In some examples, refer to FIG. 10. The optical receive stage includes a fifth switch (M1), a sixth switch (M2), and a seventh switch (M3). A first end of the fifth switch (M1) is coupled to the cathode of the photodiode, and a second end of the fifth switch (M1) is coupled to the current mirror circuit. A control end of the fifth switch (M1) is coupled to a first end of the sixth switch (M2), and a second end of the sixth switch (M2) is coupled to a fourth power supply level (VDD2). For example, a voltage of the fourth power supply level (VDD2) may be 1.8 V. A control end of the sixth switch (M2) is coupled to a preset fixed level (Vb1). A first end of the seventh switch (M3) is coupled to a control end of the fifth switch (M1), and is coupled to the first end of the sixth switch (M2). A second end of the seventh switch (M3) is grounded, and a control end of the seventh switch (M3) is coupled to the cathode of the photodiode (PD). An output end of the optical receive stage is also the first end of the sixth switch (M2). Under an effect of negative feedback, the output end of the optical receive stage is virtually grounded, and a sub-threshold region feature of the fifth switch (M1) makes a logarithmic relationship between a voltage (VQ) at the output end of the optical receive stage and a first current I, for example, InI.

The drive stage may increase isolation between the amplification stage and the optical receive stage, and the drive stage is configured to provide the first current of the logarithm domain to the amplification stage. In some examples, referring to FIG. 10, the drive stage (which may also be referred to as a source following stage) may include an eighth switch (M4) and a ninth switch (M5). A first end of the eighth switch (M4) is coupled to the fourth power supply level (VDD2), and a second end of the eighth switch (M4) is coupled to a first end of the ninth switch (M5). A control end of the eighth switch (M4) is coupled to a preset fixed level (Vb3). A second end of the ninth switch (M5) is grounded, and a control end of the ninth switch (M5) is coupled to the control end of the fifth switch (M1).

The amplification stage may include a capacitor feedback circuit, configured to amplify a changed small signal. In some examples, refer to FIG. 10. The amplification stage may include a second capacitor (C1), a third capacitor (C2), a tenth switch (M6), an eleventh switch (M7), and a twelfth switch (M8). A first electrode of the second capacitor (C1) is coupled to the second end of the eighth switch (M4), a second electrode of the second capacitor (C1) is coupled to a first electrode of the third capacitor (C2), the second electrode of the second capacitor (C1) is coupled to a first end of the tenth switch (M6), and the second electrode of the second capacitor (C1) is coupled to a control end of the eleventh switch (M7).

A second end of the tenth switch (M6) is coupled to the second electrode of the third capacitor (C2), the second end of the tenth switch (M6) is coupled to a first end of the eleventh switch (M7), and the second end of the tenth switch (M6) is coupled to a first end of the twelfth switch (M8). A control end of the tenth switch (M6) is coupled to the image signal processor, and receives an amplification control signal (RST_N). The amplification control signal (RST_N) may be provided by a response circuit in the dynamic visual measurement circuit. A second end of the eleventh switch (M7) is coupled to the fourth power supply level (VDD2). A second end of the twelfth switch (M8) is grounded, and a control end of the twelfth switch (M8) receives a fixed level VO.

A capacitor feedback circuit formed by the second capacitor (C1), the third capacitor (C2), the tenth switch (M6), the eleventh switch (M7), and the twelfth switch (M8) amplifies a changed small signal by C1/C2 times, and superimposes the small signal on a reset direct current bias voltage to change the voltage of the second electrode of the third capacitor (C2). The second electrode of the third capacitor (C2) may also be used as an output end (VC) of the amplification stage.

Figure 10:
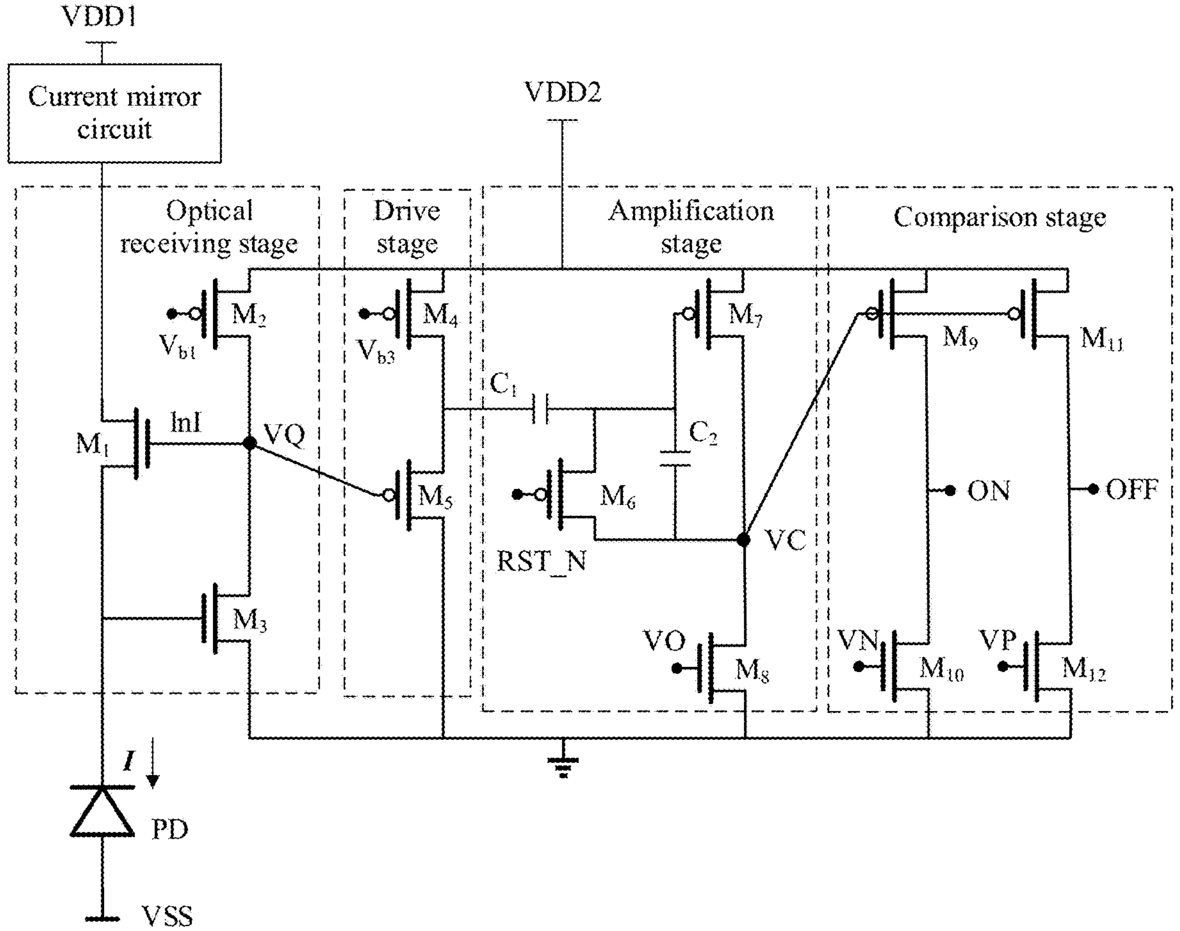
FIG. 10 is a schematic diagram of a specific structure of a dynamic visual measurement circuit.

In some examples, refer to FIG. 10. The comparison stage may include a thirteenth switch (M9), a fourteenth switch (M10), a fifteenth switch (M11), and a sixteenth switch (M12). A first end of the thirteenth switch (M9) is coupled to the second power supply level, a second end of the thirteenth switch (M9) is coupled to the first end of the fourteenth switch (M10), and a control end of the thirteenth switch (M9) is coupled to the second electrode of the third capacitor (C2). A second end of the fourteenth switch (M10) is grounded, and a control end of the fourteenth switch (M10) receives a fixed level VN. The second end of the thirteenth switch (M9) is a first output end ON of the comparison stage.

A first end of the fifteenth switch (M11) is coupled to the second power supply level, a second end of the fifteenth switch (M11) is coupled to a first end of the sixteenth switch (M12), and a control end of the fifteenth switch (M11) is coupled to the second electrode of the third capacitor (C2). A second end of the sixteenth switch (M12) is grounded, and a control end of the sixteenth switch (M12) receives a fixed level VP. The second end of the fifteenth switch (M11) is a second output end OFF of the comparison stage.

Optionally, the eleventh switch (M7), the thirteenth switch (M9), and the fifteenth switch (M11) are PMOS transistors of a same size. The twelfth switch (M8), the fourteenth switch (M10), and the sixteenth switch (M12) are NMOS transistors of a same size. The fixed level VN received by the control end of the fourteenth switch (M10) is greater than a fixed level VO received by the control end of the twelfth switch (M8), and the fixed level VP received by the control end of the sixteenth switch (M12) is less than the fixed level VO received by the control end of the twelfth switch (M8).

When the amplification control signal (RST_N) is a low level (0), the tenth switch (M6) is in a turn-on state. The level of the output end (VC) of the amplification stage is restored to the preset reset level. In this case, the first output end ON of the comparison stage outputs a low level (0), and the second output end OFF outputs a high level (1).

When the level of the amplification stage output (VC) is offset from a reset level to a positive value, and current source mismatch caused by a difference between the fixed level VP and a comparison threshold BIAS is canceled, the second output OFF outputs a low level (0). When the level of the amplification stage output (VC) is offset from the reset level to a negative value, and the current source mismatch caused by a difference between the fixed level VN and the comparison threshold BIAS is canceled, the first output ON outputs a high level (1). The foregoing process may be implemented based on the preset comparison threshold BIAS, the fixed level VP, the fixed level VN, and the fixed level VO.

The dynamic visual measurement circuit may further include the response circuit. The response circuit may receive levels of the first output end ON and the second output end OFF of the comparison stage, and latch the level of the first output end ON and the level of the second output end OFF. The response circuit may generate a request signal (REQ) based on the level of the first output end ON and the level of the second output end OFF of the comparison stage. Generating the request signal (REQ) represents that a light intensity change occurs. For example, when the first output end ON of the comparison stage is a high level (1), and the second output end OFF of the comparison stage is a low level (0), the response circuit may generate the request signal (REQ), and/or when the first output end ON of the comparison stage is a low level (0), the second output end OFF of the comparison stage is a high level (1), and the second output end OFF of the comparison stage is a low level (0), the response circuit may generate the request signal (REQ).

When the dynamic visual measurement circuit is in an initial state, the first output end ON of the comparison stage outputs a low level (0), and the second output end OFF outputs a high level (1). If the first current of the incident light increases, the level of the output end (VC) of the amplification stage decreases, the first output end ON of the comparison stage outputs a high level (1), and the second output end OFF outputs a high level (1). If the first current of the incident light decreases, the first output end ON of the comparison stage outputs a low level (0), and the second output end OFF outputs a low level (0).

The response circuit is coupled to the image signal processor, and sends the request signal (REQ) to the image signal processor. When the level of the first output end ON of the comparison stage changes from a low level to a high level, the response circuit sends the request signal (REQ) to the image signal processor. When the level of the second output end OFF of the comparator changes from a high level to a low level, the response circuit sends the request signal (REQ) to the image signal processor, so that the image signal processor learns that a light intensity change event occurs. When a dynamic event (such as a light intensity change) occurs, the output level increases or decreases quickly.

Figure 11:
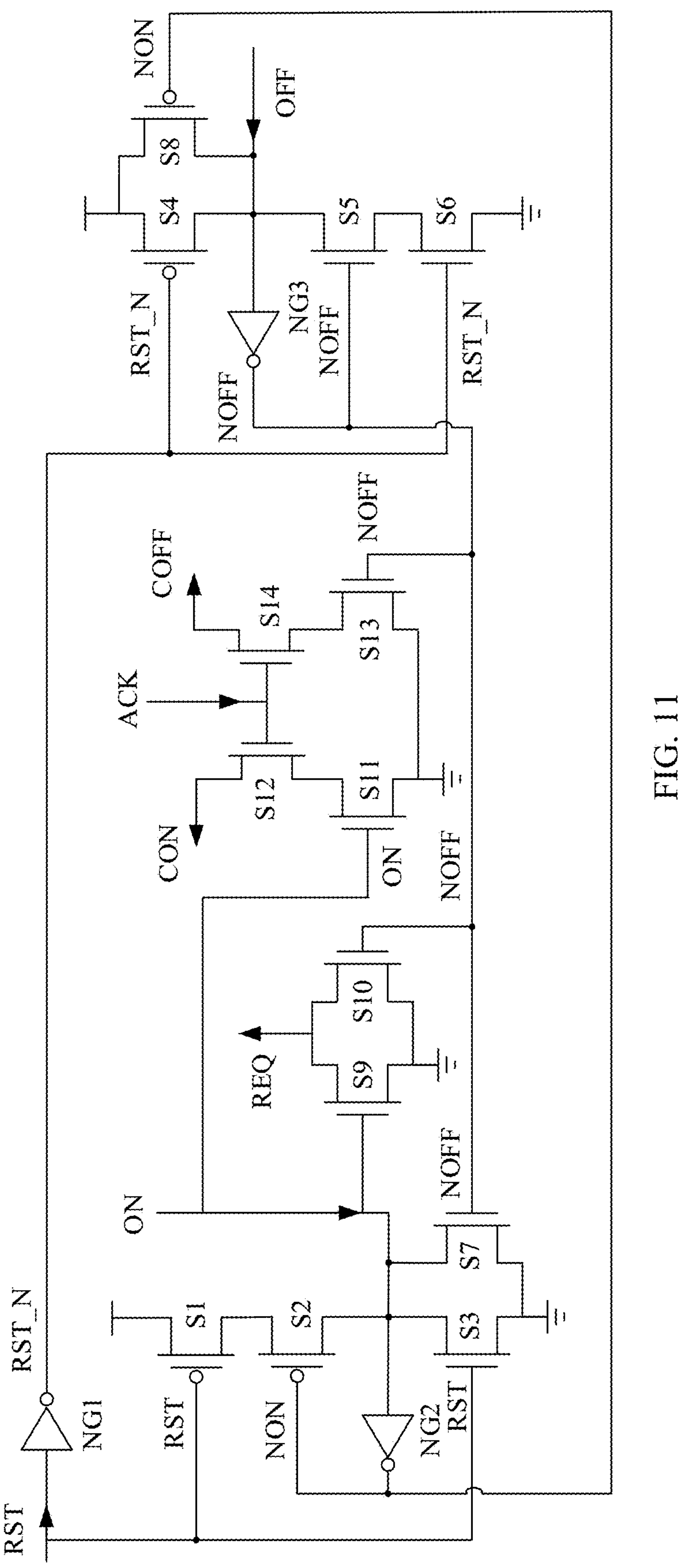
FIG. 11 is a schematic diagram of a specific structure of a response circuit in a dynamic visual measurement circuit.

In some examples, the response circuit may include a logic circuit such as an NAND gate, an NOR gate, or an NOT gate, and use a standard CMOS digital push-pull structure to implement the foregoing functions. As shown in FIG. 11, the response circuit may receive the level provided by a first output ON of the comparison stage and the level provided by a second output OFF of the comparison stage. The response circuit can receive a response signal (ACK) and a reset dynamic measurement signal (RST) provided by the image signal processor. The reset dynamic measurement signal (RST) can drive the dynamic visual measurement circuit to restore to an initial state and wait for a next change event. In the foregoing dynamic visual measurement circuit, the tenth switch in the comparison stage receives the amplification control signal (RST_N), which is an inverted signal of the reset dynamic measurement signal (RST).

As shown in FIG. 11, the response circuit has a plurality of output ends, an output end CON, and an output end COFF. In the initial state of the response circuit, a level of the output end CON is a low level (0), and a level of the output end COFF is a low level (0). When a dynamic event is generated, if the level of the output end CON is a high level (1), and the level of the output end COFF is a low level (0), it indicates that the light intensity changes positively (that is, the light intensity increases). If the level of the output end CON is a low level (0), and the level of the output end COFF is a high level (1), it indicates that the light intensity changes negatively (that is, the light intensity decreases). The image signal processor may determine a light intensity change status by using level statuses of the output end CON and the output end COFF.

For ease of description, as shown in FIG. 11, an input end that receives the reset dynamic measurement signal (RST) in the response circuit is denoted as an input end RST. An input end that receives the response signal (ACK) in the response circuit is denoted as an input end ACK. An input end connected to the first output end ON of the comparison stage in the response circuit is denoted as an input end ON, and an input end connected to the second output end OFF of the comparison stage in the response circuit is denoted as an input end OFF.

The response circuit may include a plurality of switches and a plurality of inverters. The plurality of switches are respectively denoted as a switch S1, a switch S2, . . . , and a switch S14. The plurality of inverters are respectively denoted as an inverter NG1, an inverter NG2, and an inverter NG3. A first end of the switch S1 is coupled to a power supply level, a second end of the switch S1 is coupled to a first end of the switch S2, and a control end of the switch S1 is coupled to the input end RST. A second end of the switch S2 is coupled to the input end ON, and is coupled to a first end of the switch S3. A control end of the switch S2 is coupled to an output end of the inverter NG2, and an input end of the inverter NG2 is coupled to the input end ON. A second end of the switch S3 is grounded, and a control end of the switch S3 is coupled to the input end RST. A level at the output end of the inverter NG2 is denoted as NON.

A first end of the switch S4 is coupled to the power supply level, and a second end of the switch S4 is coupled to a first end of the switch S5 and is coupled to the input end OFF. An input end of the inverter NG1 is coupled to the input end RST, and an output end of the inverter NG1 is coupled to a control end of the switch S4. A level at the output end of the inverter NG1 is denoted as RST_N. A second end of the switch S5 is coupled to a first end of the switch S6. An input end of the inverter NG3 is coupled to the input end OFF, and an output end of the inverter NG3 is coupled to a control end of the switch S5. A level at the input end of the inverter NG3 is denoted as NOFF. A second end of the switch S6 is grounded, and a control end of the switch S6 is coupled to an output end of the inverter NG1.

A first end of the switch S7 is coupled to the input end ON, a second end of the switch S7 is grounded, and a control end of the switch S7 is coupled to the output end of the inverter NG3. A first end of the switch S8 is coupled to the power supply level, a second end of the switch S8 is coupled to the input end OFF, and a control end of the switch S8 is coupled to the output end of the inverter NG2.

A first end of the switch S9 is coupled to the output end REQ, a second end of the switch S9 is grounded, and a control end of the switch S9 is coupled to the input end ON. A first end of the switch S10 is coupled to the output end REQ, a second end of the switch S10 is grounded, and a control end of the switch S10 is coupled to the output end of the inverter NG3.

A first end of the switch S11 is grounded, a second end of the switch S11 is coupled to a first end of the switch S12, and a control end of the switch S11 is coupled to the input end ON. A second end of the switch S12 is coupled to the output end CON, and a control end of the switch S12 is coupled to the input end ACK.

A first end of the switch S13 is grounded, a second end of the switch S13 is coupled to a first end of the switch S14, and a control end of the switch S13 is coupled to the output end of the inverter NG3. A second end of the switch S14 is coupled to the output end COFF, and a control end of the switch S14 is coupled to the input end ACK.

The switch S13 and the switch S14 may be in a turn-on state driven by a response control signal received by the input end ACK, so that the second end of the switch S11 is connected to the output end CON, and the second end of the switch S13 is connected to the output end COFF. If the level at the input end ON can drive the switch S11 to be in a turn-on state, the output end CON outputs a high level (1). If the level at the input end ON cannot drive the switch S11 to be in a turn-on state, the output end CON outputs a low level (0).

Figure 12:
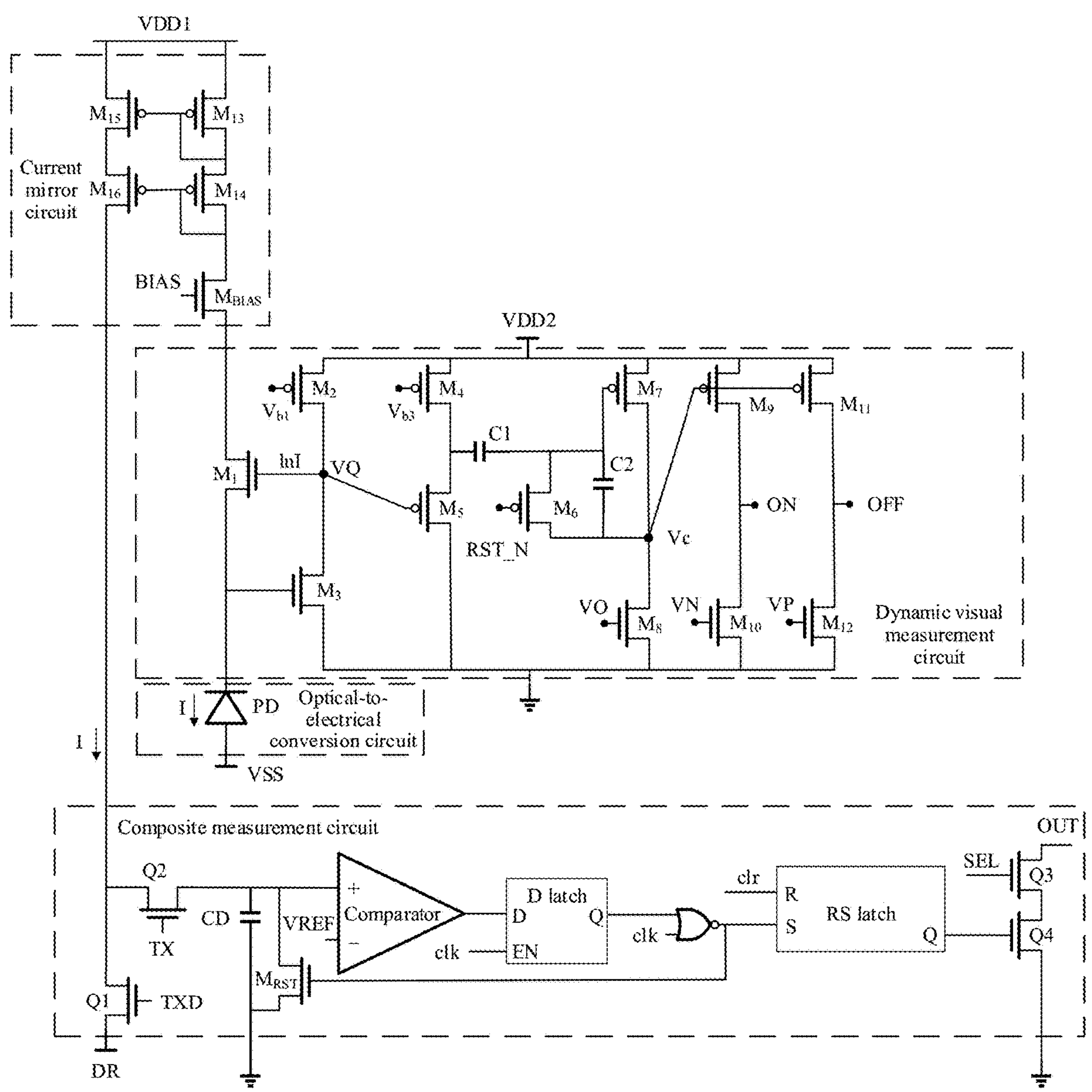
FIG. 12 is a schematic diagram of a specific structure of a pixel circuit.

In a possible implementation, as shown in FIG. 12, the current mirror circuit may include a seventeenth switch (M13), an eighteenth switch (M14), a nineteenth switch (M15), a twentieth switch (M16), and a switch MBIAS. A first end of the seventeenth switch (M13) is coupled to a second power supply level (VDD1), a second end of the seventeenth switch (M13) is coupled to a first end of the eighteenth switch (M14), and a control end of the seventeenth switch (M13) is also coupled to the first end of the eighteenth switch (M14). A second end of the eighteenth switch (M14) is coupled to a first end of the switch MBIAS, and a control end of the eighteenth switch (M14) is also coupled to the first end of the switch MBIAS. A second end of the switch MBIAS is coupled to the second end of the fifth switch (M1) in the dynamic visual measurement circuit, and a control end of the switch MBIAS is coupled to the bias level BIAS. A first end of the nineteenth switch (M15) is coupled to the second power supply level (VDD1), a second end of the nineteenth switch (M15) is coupled to a first end of the twentieth switch (M16), and a control end of the nineteenth switch (M15) is coupled to the control end of the seventeenth switch (M13). A second end of the twentieth switch (M16) is coupled to a second end of the first switch in the composite measurement circuit. A control end of the twentieth switch (M16) is coupled to the control end of the eighteenth switch (M14). In such a design, the first current is copied to the composite measurement circuit through the current mirror circuit. And the switch MBIAS can shield coupling interference of a service current of the composite measurement circuit to the dynamic visual measurement circuit.

Figure 13:
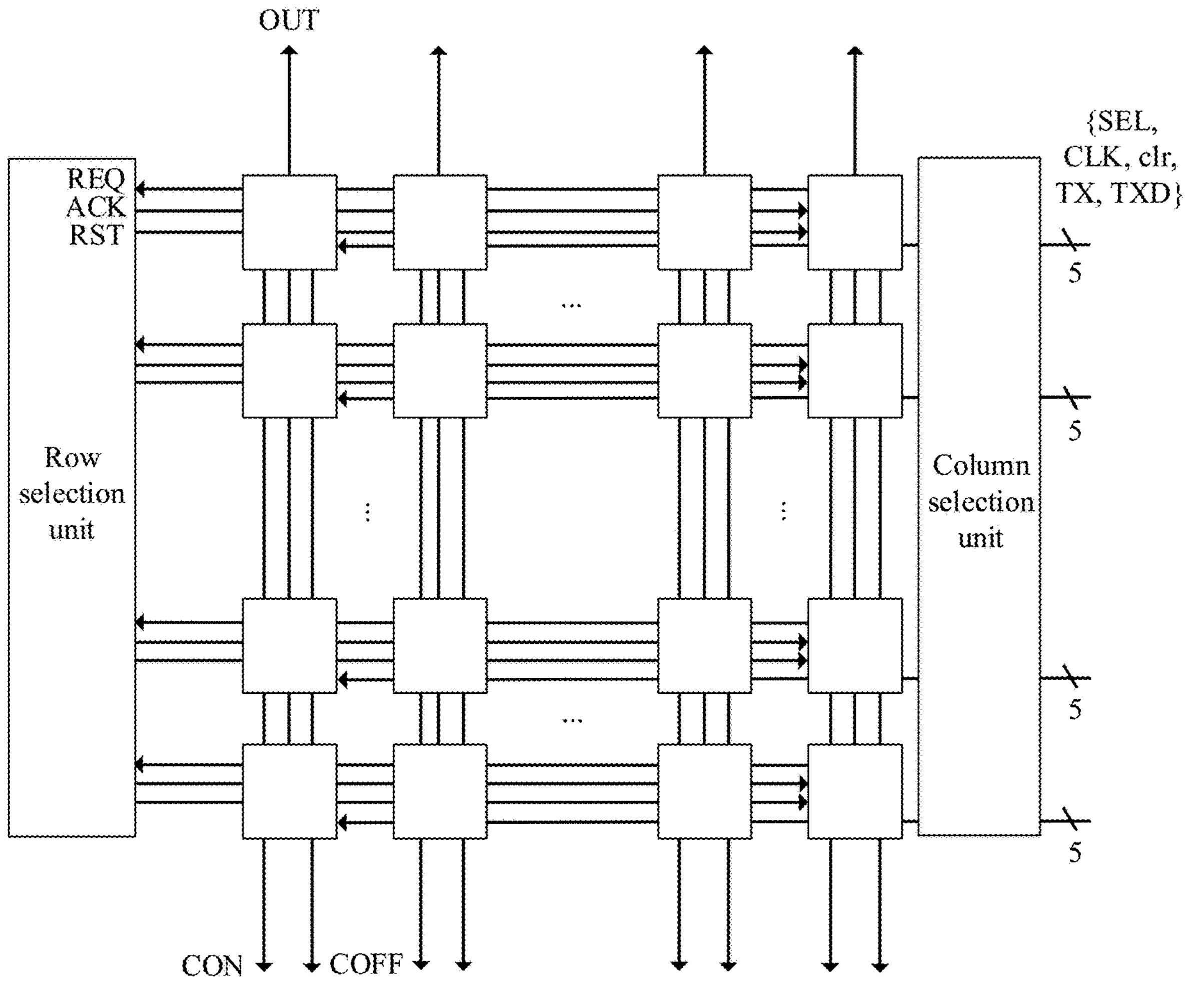
FIG. 13 is a schematic diagram of a structure of an image sensor.

Based on the pixels provided in any one of the foregoing embodiments, an embodiment of this application further provides an image sensor, and the image sensor may include a plurality of pixels arranged in an array and an image signal processor. Squares in the figure represent pixels provided in embodiments of this application. Refer to FIG. 13. An image processor may include a column selection unit. As an example, the image sensor may include n rows and m columns of pixels. A control end of a first switch (Q1) in a configuration signal receiving unit of pixels in an $n^{th}$ row is coupled to an $n^{th}$ first configuration signal terminal (TXD) of the column selection unit, and a control end of a second switch (Q2) in the configuration signal receiving unit of the pixels in the $n^{th}$ row is coupled to an $n^{th}$ second configuration signal terminal (TX) of the column selection unit. The first configuration signal terminal of the column selection unit is configured to provide a first drive signal or a third drive signal. The second configuration signal terminal of the column selection unit is configured to provide a second drive signal or a fourth drive signal. A timing control input end of a D latch in a delay sampling unit of a pixel in the $n^{th}$ row is coupled to an $n^{th}$ clock signal output terminal of the column selection unit. A second input end of an NOR gate circuit in the delay sampling unit of a pixel in the $n^{th}$ row is coupled to the $n^{th}$ clock signal output terminal of the column selection unit. The clock signal output terminal of the column selection unit is configured to output the first clock signal (clk). A reset end of an RS latch of a read unit of the pixel in the $n^{th}$ row is coupled to an $n^{th}$ reset signal terminal of the column selection unit. The reset signal terminal of the column selection unit is configured to output the foregoing reset signal (clr).

A first end of a third switch (Q3) of a read unit of a pixel in an $m^{th}$ column is coupled to a data bus of the $m^{th}$ column, and an image signal processor may receive, through a grayscale data bus of the $m^{th}$ column, data output by the pixels in the $m^{th}$ column. A read signal terminal of the column selection unit is configured to output the foregoing selection signal (sel). A control end of a third switch (Q3) of the read unit of the pixel in the $n^{th}$ row is coupled to an $n^{th}$ read signal terminal of the column selection unit. Driven by the read signal of the column selection unit, the pixel in the $n^{th}$ row output data to a grayscale data bus coupled to a column in which each pixel is located.

It can be learned from the foregoing description that all pixels in the $n^{th}$ row may share five control signals provided by the column selection unit, which are respectively the selection signal (sel), the reset signal (clr), the first clock signal (clk), a signal (TXD) provided by the first configuration signal terminal, and a signal (TX) provided by the second configuration signal terminal. The signal (TXD) provided by the first configuration signal terminal and the signal (TX) provided by the second configuration signal terminal may be used to configure an operating mode of the composite measurement circuit. After the composite measurement circuit completes an integration process and resets a threshold voltage to an initial voltage, the composite measurement circuit outputs a pulse, and samples the first clock signal (clk) and the selection signal (sel) for a plurality of times within a fixed time. After each time of sampling, the reset signal (clr) is used to clear the sampling. Counting a frequency at which the pulse is generated may be used to encode an intensity of light. Therefore, grayscale data of the pixel has only one bit, and the column selection unit performs progressive scanning and outputs pulse data OUT upwards.

Refer to FIG. 13. In a possible implementation, each pixel in the image sensor includes a dynamic visual measurement circuit. The image signal processor may further include a row selection unit (which may also be referred to as a dynamic visual measurement synchronization arbiter). An input end RST of the pixel in the $n^{th}$ row is coupled to an $n^{th}$ reset dynamic measurement signal end of the row selection unit. A reset dynamic measurement signal end of the row selection unit is configured to output the foregoing reset dynamic measurement signal (RET). An input end ACK of the pixel in the $n^{th}$ row is coupled to an $n^{th}$ response control signal end of the row selection unit. A response control signal end of the row selection unit is configured to output the response control signal (ACK).

An output end REQ of the pixel in the $n^{th}$ row is coupled to an $n^{th}$ time request signal end of the row selection unit, and a request signal end of the row selection unit is coupled to receive the foregoing request signal (REQ).

An output end CON of the pixel in the $m^{th}$ column is coupled to the image processor through a first dynamic event data bus, and an output end COFF of the pixel in the $m^{th}$ column is coupled to the image processor through a second dynamic event data bus. Driven by a response control signal (ACK), the pixel in the $n^{th}$ row separately outputs light intensity change data to the first dynamic event bus and the second dynamic event bus that are coupled to the column in which each pixel is located.

It is assumed that when the light intensity change event is generated on a pixel in an $i^{th}$ row, a request signal (REQ) is sent to the row selection unit (arbiter), and the row selection unit (arbiter) sends a response signal (ACK) signal to the pixel in the $i^{th}$ row, so that the pixel in the $i^{th}$ row transmits two bits of data (a level of the output end CON of the pixel and a level of the output end COFF of the pixel) of time to the first dynamic event bus and the second dynamic event bus. After delay time, the row selection unit (arbiter) sends a reset signal (RST) to the pixel in the $i^{th}$ row, so that the dynamic visual measurement circuit in the pixel in the $i^{th}$ row is restored to an initial state and waits for a next change time.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A pixel of an image sensor, comprising:

an optical-to-electrical conversion circuit, configured to generate a first current based on incident light that is incident on the pixel; and a composite measurement circuit, coupled to the optical-to-electrical conversion circuit, wherein the composite measurement circuit comprises a configuration signal receiving unit, an integration unit, a comparison unit, and a delay sampling unit;

a first end of the configuration signal receiving unit is coupled to the optical-to-electrical conversion circuit, a second end of the configuration signal receiving unit is coupled to a first end of the integration unit and an input end of the comparison unit, and wherein the configuration signal receiving unit is configured to: output the first current to the integration unit; or receive a plurality of sampling signals, and periodically output the first current to the integration unit based on signal periods of the plurality of sampling signals;

a second end of the integration unit is coupled to a first level, and the integration unit is configured to integrate the first current to obtain a measured voltage, and provide the measured voltage to the comparison unit;

an input end of the comparison unit is coupled to the first end of the integration unit, and is configured to: compare the measured voltage with a preset reference voltage, and send a comparison result signal to the delay sampling unit, wherein based on the measured voltage being less than a reference level, a level of the comparison result signal is a second level; based on the measured voltage being greater than or equal to the reference level, a level of the comparison result signal is a third level; and the second level is greater than the third level; and the delay sampling unit is coupled to an output end of the comparison unit, and the delay sampling unit is configured to perform sampling processing on the comparison result signal to generate a first pulse signal or a plurality of second pulse signals, wherein the first pulse signal represents intensity information of the incident light, the plurality of sampling signals are in a one-to-one correspondence with the plurality of second pulse signals, the plurality of second pulse signals represent a phase offset between a phase of the incident light and a specified phase, and the incident light is a reflected light ray that is of the specified phase and that is incident to a target object.

2. The pixel according to claim 1, wherein in a first operating mode, the pixel generates the first pulse signal based on the first current; and in a second operating mode, the pixel receives the plurality of sampling signals, and generates the plurality of second pulse signals based on the first current and the plurality of sampling signals.

3. The pixel according to claim 1, wherein the optical-to-electrical conversion circuit comprises a photodiode; and an anode of the photodiode is coupled to a first power supply level, a cathode of the photodiode is coupled to the composite measurement circuit and a second power supply level, and the second power supply level is greater than the first power supply level.

4. The pixel according to claim 1, wherein the configuration signal receiving unit comprises a first switch and a second switch;

a first end of the first switch is coupled to a third power supply level, a second end of the first switch is coupled to the optical-to-electrical conversion circuit, the second end of the first switch is coupled to a first end of the second switch, a second end of the second switch is coupled to the first end of the integration unit, and the third power supply level is less than a second power supply level; and based on the first switch being in a turn-off state and the second switch being in a turn-on state, the first current is transmitted to the integration unit; or based on the first switch being in a turn-on state and the second switch being in a turn-off state, the first current is transmitted to the third power supply level.

5. The pixel according to claim 4, wherein in a first operating mode, a control end of the first switch receives a first drive signal, and the first drive signal is a fixed level signal and is used to drive the first switch to be in a turn-off state; and the control end of the second switch receives a second drive signal, wherein the second drive signal is a fixed level signal and is used to drive the second switch to be in a turn-on state.

6. The pixel according to claim 4, wherein in a second operating mode, a control end of the first switch receives a third drive signal, the third drive signal is a periodic signal, and the first switch is configured to control the first switch to alternate between a turn-on state and a turn-off state based on a period of the third drive signal; and a control end of the second switch receives the plurality of sampling signals, each sampling signal is a periodic signal, and the second switch is configured to control the second switch to alternate between a turn-on state and a turn-off state based on a period of each sampling signal, wherein based on the second switch is being a turn-on state, the first switch is in a turn-off state; or based on the first switch being in a turn-on state, the second switch is in a turn-off state.

7. The pixel according to claim 1, wherein the integration unit comprises a first capacitor, a first electrode of the first capacitor is coupled to the optical-to-electrical conversion circuit through a second switch, and a second electrode of the first capacitor is coupled to the first level.

8. The pixel according to claim 1, wherein the comparison unit comprises a comparator;

a first input end of the comparator is coupled to the first end of the integration unit, and is configured to receive the measured voltage;

a second input end of the comparator is coupled to the reference voltage; and an output end of the comparator is coupled to the delay sampling unit, and is configured to output the comparison result signal.

9. The pixel according to claim 1, wherein the delay sampling unit comprises a D latch and an NOR gate circuit;

a data input end of the D latch is coupled to the output end of the comparator, and is configured to receive the comparison result signal;

a timing control input end of the D latch is configured to receive a first clock signal;

a Q output end of the D latch is coupled to a first input end of the NOR circuit, and is configured to output a signal to the NOR circuit;

a second input end of the NOR gate circuit is configured to receive the first clock signal; and an output end of the NOR gate circuit is coupled to an image signal processor, and is configured to output the first pulse signal or the second pulse signal.

10. The pixel according to claim 1, wherein the composite measurement circuit further comprises a reset switch, a first end of the reset switch is grounded, a second end of the reset switch is coupled to the first end of the integration unit, and a control end of the reset switch is coupled to the delay sampling unit, and is configured to receive the first pulse signal; and in a time period in which a level of the first pulse signal is a fourth level, the reset switch is in a turn-off state; and in a time period in which a level of the first pulse signal is a fifth level, the reset switch is in a turn-on state, so that a voltage at the first end of the integration unit is a reset voltage, wherein the fourth level is greater than the fifth level.

11. The pixel according to claim 1, wherein the composite measurement circuit further comprises a read unit, and the read unit is coupled to the delay sampling unit and is coupled to an image signal processor; and the read unit is configured to:

receive a storage signal provided by the image signal processor, and buffer the first pulse signal or the second pulse signal based on the storage signal; and receive a scanning signal provided by the image signal processor, and output a buffered signal to the image signal processor based on the scanning signal.

12. The pixel according to claim 11, wherein the read unit comprises a third switch, a fourth switch, and an RS latch;

a first end of the third switch is coupled to the image signal processor, a second end of the third switch is coupled to a first electrode of the fourth switch, and a control end of the third switch is configured to receive the scanning signal provided by the image signal processor, wherein the scanning signal is used to drive the third switch to be in a turn-on state;

a second electrode of the fourth switch is grounded, and a control end of the fourth switch is coupled to a Q output end of the RS latch; and a reset end of the RS latch is coupled to the image signal processor, and is configured to receive the storage signal or a reset signal provided by the image signal processor, a set end of the RS latch is coupled to an output end of the delay sampling unit, and is configured to receive the first pulse signal, and a level at the Q output end of the RS latch is the same as the level of the first pulse signal; or receive the second pulse signal, and a level at the Q output end of the RS latch is the same as a level of the second pulse signal.

13. The pixel according to claim 1, further comprising a dynamic visual measurement circuit, which is coupled to the optical-to-electrical conversion circuit and to an image signal processor, and is configured to:

generate a level indication signal based on the first current, and send the level indication signal to the image signal processor, wherein the level indication signal represents light intensity variation information of the incident light.

14. The pixel according to claim 13, further comprising a current mirror circuit, and the composite measurement circuit is coupled to the optical-to-electrical conversion circuit through the current mirror circuit; and the current mirror circuit is configured to provide the composite measurement circuit with the first current generated by the optical-to-electrical conversion circuit.

15. An image sensor, comprising an array of a plurality of pixels, wherein at least one pixel of the plurality of pixels comprises:

an optical-to-electrical conversion circuit, configured to generate a first current based on incident light that is incident on the pixel; and a composite measurement circuit, coupled to the optical-to-electrical conversion circuit, wherein the composite measurement circuit comprises a configuration signal receiving unit, an integration unit, a comparison unit, and a delay sampling unit;

a first end of the configuration signal receiving unit is coupled to the optical-to-electrical conversion circuit, a second end of the configuration signal receiving unit is coupled to a first end of the integration unit and an input end of the comparison unit, and wherein the configuration signal receiving unit is configured to: output the first current to the integration unit; or receive a plurality of sampling signals, and periodically output the first current to the integration unit based on signal periods of the plurality of sampling signals;

a second end of the integration unit is coupled to a first level, and the integration unit is configured to integrate the first current to obtain a measured voltage, and provide the measured voltage to the comparison unit;

an input end of the comparison unit is coupled to the first end of the integration unit, and is configured to: compare the measured voltage with a preset reference voltage, and send a comparison result signal to the delay sampling unit, wherein based on the measured voltage being less than a reference level, a level of the comparison result signal is a second level; based on the measured voltage being greater than or equal to the reference level, a level of the comparison result signal is a third level; and the second level is greater than the third level; and the delay sampling unit is coupled to an output end of the comparison unit, and the delay sampling unit is configured to perform sampling processing on the comparison result signal to generate a first pulse signal or a plurality of second pulse signals, wherein the first pulse signal represents intensity information of the incident light, the plurality of sampling signals are in a one-to-one correspondence with the plurality of second pulse signals, the plurality of second pulse signals represent a phase offset between a phase of the incident light and a specified phase, and the incident light is a reflected light ray that is of the specified phase and that is incident to a target object.

16. The sensor according to claim 15, further comprising an image signal processor, wherein the image signal processor is coupled to the composite measurement circuit; and the image signal processor is configured to:

control a target pixel to be in a first operating mode, wherein the target pixel is any pixel in the at least one pixel; and receive a first pulse signal, and determine, based on a frequency of the first pulse signal, intensity information of incident light incident on the target pixel.

17. The sensor according to claim 16, wherein the image signal processor is further configured to:

control the target pixel to be in a second operating mode, and sequentially send, to the target pixel based on a plurality of preset phases, a plurality of sampling signals corresponding to the plurality of phases, wherein the plurality of phases are in a one-to-one correspondence with the plurality of sampling signals;

receive a plurality of second pulse signals, wherein the plurality of sampling signals are in a one-to-one correspondence with the plurality of second pulse signals; and determine, based on each of the plurality of second pulse signals, a phase offset between a phase of the incident light incident on the target pixel and a specified phase, wherein the incident light is a reflected light ray that is of the specified phase and that is incident to a target object.

18. The sensor according to claim 17, wherein the image signal processor is further configured to:

determine a quantity corresponding to each second pulse signal, wherein the quantity corresponding to each second pulse signal is a quantity of rising edges of each second pulse signal in preset duration;

determine the phase offset based on the quantity corresponding to the plurality of second pulse signals; and determine a distance between the target pixel and the target object based on the phase offset.

19. The sensor according to claim 15, wherein in a first operating mode, the at least one pixel generates the first pulse signal based on the first current; and in a second operating mode, the at least one pixel receives the plurality of sampling signals, and generates the plurality of second pulse signals based on the first current and the plurality of sampling signals.

20. The sensor according to claim 15, wherein the optical-to-electrical conversion circuit comprises a photodiode; and an anode of the photodiode is coupled to a first power supply level, a cathode of the photodiode is coupled to the composite measurement circuit and a second power supply level, and the second power supply level is greater than the first power supply level.

* * * * *